US012812062B2

(12) United States Patent

Matsui et al.

(10) Patent No.: US 12,812,062 B2
(45) Date of Patent: Nov. 24, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Fumino Matsui, Kanagawa (JP); Yoshinori Mizoguchi, Tokyo (JP); Kouta Murasawa, Kanagawa (JP); Akitoshi Yamada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 282 days.

(21) Appl. No.: 18/643,123

(22) Filed: Apr. 23, 2024

(65) Prior Publication Data

US 2024/0364837 A1 Oct. 31, 2024

(30) Foreign Application Priority Data

Apr. 28, 2023 (JP) ................................ 2023-074950

(51) Int. Cl.
*H04N 1/60* (2006.01)
*G06T 7/90* (2017.01)
*G06V 10/56* (2022.01)

(52) U.S. Cl.
CPC ............. *H04N 1/6058* (2013.01); *G06T 7/90* (2017.01); *G06V 10/56* (2022.01); *G06T 2207/10024* (2013.01)

(58) Field of Classification Search
CPC .................... H04N 1/6058; G06T 7/90; G06T 2207/10024; G06V 10/56
See application file for complete search history.

(56) References Cited

U.S. PATENT DOCUMENTS 6,016,359 A 1/2000 Komatsu .................. H04N 1/60
10,764,472 B2 9/2020 Yamashita ............... H04N 1/60
(Continued)

FOREIGN PATENT DOCUMENTS

JP H07203234 A 8/1995
JP 2020-27948 A 2/2020

OTHER PUBLICATIONS

U.S. Appl. No. 18/647,828, filed Apr. 26, 2024, Title: Image Processing Apparatus, Image Processing Method, and Non-Transitory Computer-Readable Storage Medium, GAU: NYA, Inventors: Fumino Matsui, Yoshinori Mizoguchi, Kouta Murasawa, Akitoshi Yamada.

(Continued)

*Primary Examiner* — Atiba O Fitzpatrick
(74) *Attorney, Agent, or Firm* — Venable LLP

(57) ABSTRACT

An apparatus performs color conversion of color information of image data into color information of a different color gamut and determines whether color information representing substantially the same color as one piece of color information of a first group of color information in a first area of the image data is included in a second group of color information in a second area of the image data. In a case when a result of the determination indicates that first color information of the first group represents substantially the same color as second color information of the second group, a color difference between a first conversion color obtained by color conversion of the first color information using first color conversion information and a second conversion color obtained by color conversion of the second color information using second color conversion information is less than a predetermined value.

12 Claims, 23 Drawing Sheets

2001

| INPUT | OUTPUT | HUE ANGLE | COMMON COLOR? | COLOR THAT IS COMMON COLOR |
|---|---|---|---|---|
| INPUT COLOR 1607 | OUTPUT COLOR 1607 | 60° | ○ | INPUT COLOR 1610 |
| INPUT COLOR 1608 | OUTPUT COLOR 1608 | 60° | ○ | INPUT COLOR 1611 |
| INPUT COLOR 1609 | OUTPUT COLOR 1609 | 60° | ○ | INPUT COLOR 1612, 1615 |

2002

| INPUT | OUTPUT | HUE ANGLE | COMMON COLOR? | COLOR THAT IS COMMON COLOR |
|---|---|---|---|---|
| INPUT COLOR 1610 | OUTPUT COLOR 1610 | 60° | ○ | INPUT COLOR 1607 |
| INPUT COLOR 1611 | OUTPUT COLOR 1611 | 60° | ○ | INPUT COLOR 1608 |
| INPUT COLOR 1612 | OUTPUT COLOR 1612 | 60° | ○ | INPUT COLOR 1609, 1615 |
| INPUT COLOR 1613 | OUTPUT COLOR 1613 | 60° | × | NO |

2003

| INPUT | OUTPUT | HUE ANGLE | COMMON COLOR? | COLOR THAT IS COMMON COLOR |
|---|---|---|---|---|
| INPUT COLOR 1614 | OUTPUT COLOR 1614 | 60° | × | NO |
| INPUT COLOR 1615 | OUTPUT COLOR 1615 | 0° | ○ | INPUT COLOR 1609, INPUT COLOR 1612 |
| INPUT COLOR 1616 | OUTPUT COLOR 1616 | 60° | × | NO |
| INPUT COLOR 1617 | OUTPUT COLOR 1617 | 0° | × | NO |

(56) References Cited

U.S. PATENT DOCUMENTS

| | | | | |
|---|---|---|---|---|
| 2003/0164983 | A1 | 9/2003 | Yamada et al. | G06T 5/00 |
| 2004/0196478 | A1 | 10/2004 | Imafuku et al. | G06T 5/00 |
| 2010/0097622 | A1* | 4/2010 | Qiao | H04N 1/6058 358/1.9 |
| 2011/0194130 | A1* | 8/2011 | Yamagishi | H04N 1/6058 358/1.9 |
| 2011/0285777 | A1 | 11/2011 | Goto et al. | B41J 2/205 |
| 2011/0285778 | A1 | 11/2011 | Ishikawa et al. | B41J 2/205 |
| 2011/0285779 | A1 | 11/2011 | Yamada et al. | B41J 2/205 |
| 2012/0081441 | A1 | 4/2012 | Miyake et al. | B41J 2/205 |
| 2012/0081768 | A1 | 4/2012 | Iguchi et al. | G03F 3/08 |
| 2014/0055518 | A1 | 2/2014 | Saito et al. | B41J 2/205 |
| 2015/0022863 | A1 | 1/2015 | Fujita et al. | G06K 15/02 |
| 2016/0277639 | A1* | 9/2016 | Arai | H04N 1/6094 |
| 2017/0173971 | A1 | 6/2017 | Yamada et al. | B41J 2/21 |
| 2018/0109702 | A1* | 4/2018 | Na | H04N 1/646 |
| 2018/0174271 | A1 | 6/2018 | Hashii et al. | G06T 3/40 |
| 2020/0007695 | A1 | 1/2020 | Kagawa et al. | H04N 1/00 |
| 2021/0218865 | A1 | 7/2021 | Tsuchiya et al. | H04N 1/64 |
| 2022/0253655 | A1 | 8/2022 | Abe et al. | G06K 15/02 |
| 2022/0358777 | A1 | 11/2022 | Mizoguchi et al. | G06V 30/19 |
| 2023/0124689 | A1 | 4/2023 | Yamada et al. | H04N 1/60 |
| 2023/0347673 | A1 | 11/2023 | Abe et al. | B41M 3/06 |
| 2024/0013507 | A1 | 1/2024 | Murasawa et al. | G06V 10/56 |
| 2024/0106964 | A1 | 3/2024 | Nakamura et al. | H04N 1/60 |
| 2024/0202977 | A1 | 6/2024 | Mizoguchi et al. | G06T 7/90 |
| 2024/0205353 | A1 | 6/2024 | Murasawa et al. | H04N 1/60 |

OTHER PUBLICATIONS

U.S. Appl. No. 18/647,828, filed Apr. 26, 2024.

* cited by examiner

FIG. 20

2001

| INPUT | OUTPUT | HUE ANGLE | COMMON COLOR? | COLOR THAT IS COMMON COLOR |
|---|---|---|---|---|
| INPUT COLOR 1607 | OUTPUT COLOR 1607 | 60° | ○ | INPUT COLOR 1610 |
| INPUT COLOR 1608 | OUTPUT COLOR 1608 | 60° | ○ | INPUT COLOR 1611 |
| INPUT COLOR 1609 | OUTPUT COLOR 1609 | 60° | ○ | INPUT COLOR 1612, 1615 |

2002

| INPUT | OUTPUT | HUE ANGLE | COMMON COLOR? | COLOR THAT IS COMMON COLOR |
|---|---|---|---|---|
| INPUT COLOR 1610 | OUTPUT COLOR 1610 | 60° | ○ | INPUT COLOR 1607 |
| INPUT COLOR 1611 | OUTPUT COLOR 1611 | 60° | ○ | INPUT COLOR 1608 |
| INPUT COLOR 1612 | OUTPUT COLOR 1612 | 60° | ○ | INPUT COLOR 1609, 1615 |
| INPUT COLOR 1613 | OUTPUT COLOR 1613 | 60° | × | NO |

2003

| INPUT | OUTPUT | HUE ANGLE | COMMON COLOR? | COLOR THAT IS COMMON COLOR |
|---|---|---|---|---|
| INPUT COLOR 1614 | OUTPUT COLOR 1614 | 60° | × | NO |
| INPUT COLOR 1615 | OUTPUT COLOR 1615 | 0° | ○ | INPUT COLOR 1609, INPUT COLOR 1612 |
| INPUT COLOR 1616 | OUTPUT COLOR 1616 | 60° | × | NO |
| INPUT COLOR 1617 | OUTPUT COLOR 1617 | 0° | × | NO |

IMAGE PROCESSING APPARATUS, IMAGE PROCESSING METHOD, AND NON-TRANSITORY COMPUTER-READABLE STORAGE MEDIUM

CROSS REFERENCE TO PRIORITY APPLICATION

This application claims the benefit of Japanese Patent Application No. 2023-074950, filed Apr. 28, 2023, which is hereby incorporated by reference herein in its entirety.

BACKGROUND OF THE INVENTION

Field of the Invention

The present invention relates to a color mapping technique.

Description of the Related Art

There is known an image processing apparatus that receives a digital original described in a predetermined color space, performs, for each color in the color space, mapping to a color gamut that can be reproduced by a printer, and outputs the original. Japanese Patent Laid-Open No. 2020-27948 describes "perceptual" mapping and "absolute colorimetric" mapping. In addition, Japanese Patent Laid-Open No. 07-203234 describes deciding the presence/absence of color space compression and the compression direction for an input color image signal.

If "perceptual" mapping described in Japanese Patent Laid-Open No. 2020-27948 is performed, chroma may lower even for a color that can be reproduced by the printer in the color space of the digital original. If "absolute colorimetric" mapping is performed, color degeneration that the distance between colors after mapping becomes smaller than the distance between colors before mapping may occur in a plurality of colors included in the digital original among a plurality of colors outside the reproduction color gamut of the printer. In addition, in Japanese Patent Laid-Open No. 07-203234, there are concerns about the effect of reducing the degree of color degeneration because unique compression is performed in the chroma direction for the input color image signal.

SUMMARY OF THE INVENTION

The present invention provides a technique of making it possible to perform color conversion to reduce the degree of color degeneration.

According to the first aspect of the present invention, an image processing apparatus comprises a color conversion unit configured to perform color conversion of color information of image data into color information of a different color gamut using color conversion information, an acquisition unit configured to acquire a first color information group included in a first area of the image data and a second color information group included in a second area of the image data, and a determination unit configured to determine, for each of a plurality of pieces of color information of the first color information group, whether color information representing substantially the same color as one piece of color information of the first color information group is included in the second color information group, wherein, in a case when a determination result of the determination unit indicates that first color information of the first color information group represents substantially the same color as second color information of the second color information group, a color difference between a first conversion color obtained by performing color conversion of the first color information using first color conversion information and a second conversion color obtained by performing color conversion of the second color information using second color conversion information is less than a predetermined value.

According to the second aspect of the present invention, an image processing method comprises performing color conversion of color information of image data into color information of a different color gamut using color conversion information, acquiring a first color information group included in a first area of the image data and a second color information group included in a second area of the image data, and determining, for each of a plurality of pieces of color information of the first color information group, whether color information representing substantially the same color as one piece of color information of the first color information group is included in the second color information group, wherein, in a case when a result of the determination indicates that first color information of the first color information group represents substantially the same color as second color information of the second color information group, a color difference between a first conversion color obtained by performing color conversion of the first color information using first color conversion information and a second conversion color obtained by performing color conversion of the second color information using second color conversion information is less than a predetermined value.

According to the third aspect of the present invention, a non-transitory computer-readable storage medium storing a computer program for causing a computer to function as a color conversion unit configured to perform color conversion of color information of image data into color information of a different color gamut using color conversion information, an acquisition unit configured to acquire a first color information group included in a first area of the image data and a second color information group included in a second area of the image data, and a determination unit configured to determine, for each of a plurality of pieces of color information of the first color information group, whether color information representing substantially the same color as one piece of color information of the first color information group is included in the second color information group, wherein, in a case when a determination result of the determination unit indicates that first color information of the first color information group represents substantially the same color as second color information of the second color information group, a color difference between a first conversion color obtained by performing color conversion of the first color information using first color conversion information and a second conversion color obtained by performing color conversion of the second color information using second color conversion information is less than a predetermined value.

Further features of the present invention will become apparent from the following description of exemplary embodiments with reference to the attached drawings.

BRIEF DESCRIPTION OF THE DRAWINGS

FIG. 20 is a view showing an example of a list of pieces of information acquired for each page in step S601;

DESCRIPTION OF THE EMBODIMENTS

Figure 1:
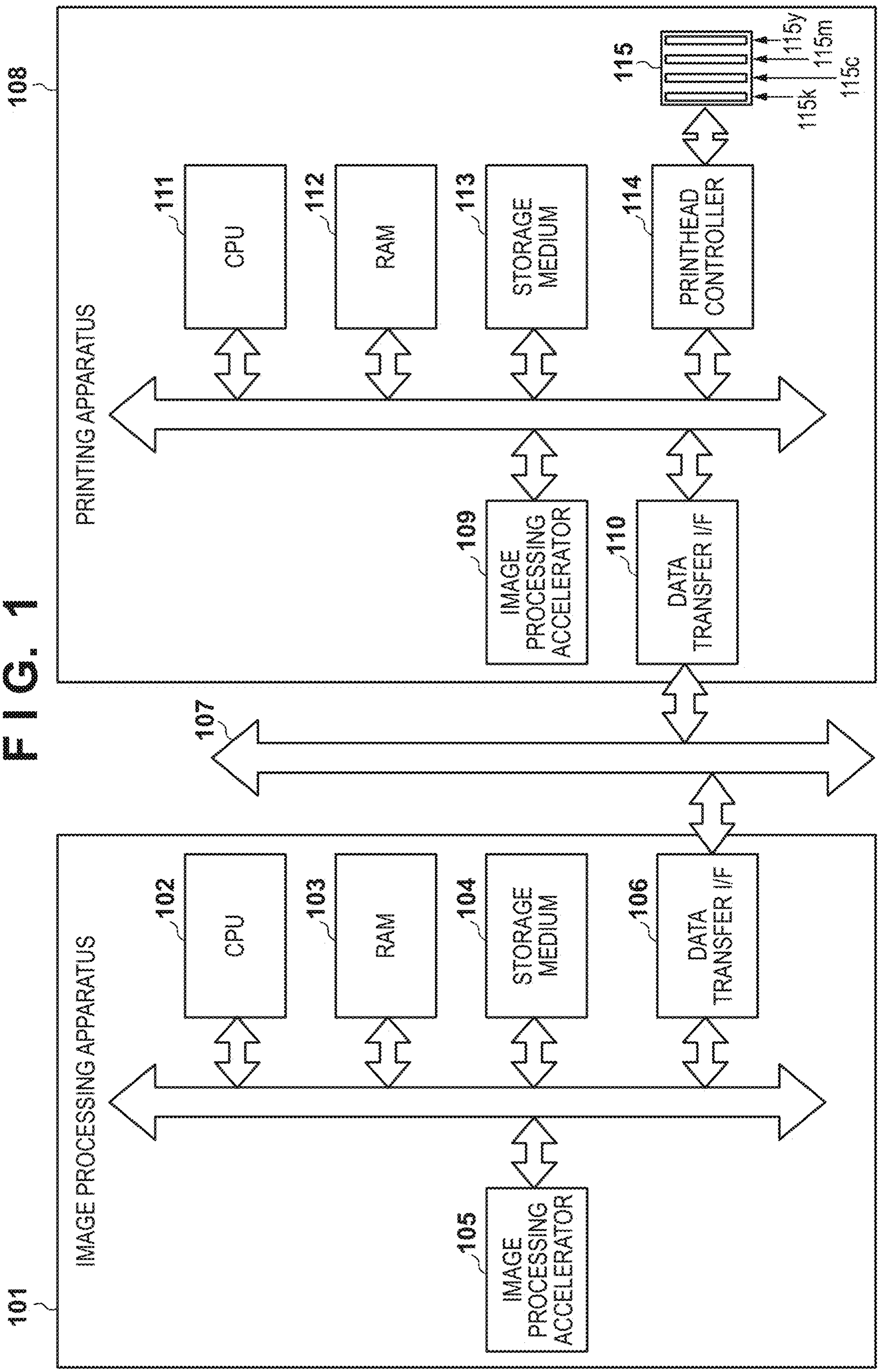
FIG. 1 is a block diagram showing an example of the configuration of a system.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, terms used in this specification are defined in advance, as follows.

(Color Reproduction Region)

A color reproduction region indicates the range of colors that can be reproduced in an arbitrary color space. The color reproduction region is also called a color reproduction range, a color gamut, or a gamut. A gamut volume is an index representing the extent of this color reproduction region. The gamut volume is a three-dimensional volume in an arbitrary color space. Chromaticity points forming the color reproduction region are sometimes discrete. For example, a specific color reproduction region is represented by 729 points on CIE-L*a*b*, and points between them are obtained by using a well-known interpolating operation such as tetrahedral interpolation or cubic interpolation. In this case, as the corresponding gamut volume, it is possible to use a volume obtained by calculating the volumes on CIE-L*a*b* of tetrahedrons or cubes forming the color reproduction region and accumulating the calculated volumes, in accordance with the interpolating operation method.

The color reproduction region and the color gamut in this specification are not limited to a specific color space. In this specification, however, a color reproduction region in the CIE-L*a*b* space will be explained as an example. Similarly, the numerical value of a color reproduction region in this specification indicates a volume obtained by accumulation in the CIE-L*a*b* space on the premise of tetrahedral interpolation.

(Gamut Mapping)

Gamut mapping is conversion processing between different color gamuts. For example, gamut mapping is mapping of an input color gamut to an output color gamut. Conversion in the same color gamut is not called gamut mapping. Perceptual/Saturation/Colorimetric, and the like of the ICC profile are general. In the mapping processing, conversion may be performed using one 3D LUT. Furthermore, the mapping processing may be performed after conversion of a color space into a standard color space. For example, if an input color space is sRGB, conversion into the CIE-L*a*b* color space is performed. The mapping processing to an output color gamut is performed on the CIE-L*a*b* color space. The mapping processing may be processing using a 3D LUT or processing using a conversion formula. Conversion between the input color space and the output color space may be performed simultaneously. For example, the input color space may be the sRGB color space, and conversion into RGB values or CMYK values unique to a printing apparatus may be performed at the time of output.

(Original Data)

Original data indicates whole input digital data as a processing target, and may be data of one page (single page) or data of a plurality of pages. The data of the single page may be represented as image data or a drawing command. If the data of the single page is represented as a drawing command, the data may be rendered based on the drawing command, converted into image data, and then processed. The image data is data of an image formed by a plurality of pixels that are two-dimensionally arranged. Each pixel holds information indicating a color in a color space. Examples of the information indicating a color are, for example, RGB values, CMYK values, a K value, CIE-L*a*b* values, HSV values, and HLS values.

(Color Degeneration)

In this specification, the fact that when performing gamut mapping for arbitrary two colors, the distance between the colors after mapping in a predetermined color space is smaller than the distance between the colors before mapping is defined as color degeneration. More specifically, assume that there are a color A and a color B in a digital original, and mapping to the color gamut of a printer is performed to convert the color A into a color C and the color B into a color D. In this case, the fact that the distance between the colors C and Dis smaller than the distance between the colors A and B is defined as color degeneration. If color degeneration occurs, colors that are recognized as different colors in the digital original are recognized as identical colors when the original is printed. For example, in a graph, different items are recognized as different items by different colors. When color degeneration occurs, different colors may be recognized as identical colors and thus the different items in the graph may erroneously be recognized as identical items. The predetermined color space in which the distance between the colors is calculated may be an arbitrary color space. Examples of the color space are the sRGB color space, the Adobe RGB color space, the CIE-L*a*b* color space, the CIE-LUV color space, the XYZ color space, the xyY color space, the HSV color space, and the HLS color space.

Example of Configuration of System

An example of the configuration of a system according to this embodiment will be described first with reference to a block diagram shown FIG. 1. As shown in FIG. 1, the system according to this embodiment includes an image processing apparatus 101 and a printing apparatus 108, and the image processing apparatus 101 and the printing apparatus 108 are configured to perform data communication via a wired and/or wireless network 107 such as a LAN. Note that the network 107 may be a USB hub, a wireless communication network using a wireless access point, or connection using a Wi-fi direct communication function.

The image processing apparatus 101 will be described first. The image processing apparatus 101 is a computer apparatus such as a personal computer (PC), a tablet terminal apparatus, a smartphone, or a server.

A CPU 102 executes various processes using computer programs and data stored in a RAM 103. This causes the CPU 102 to control the overall operation of the image processing apparatus 101 and to execute or to control various processes to be described as those performed by the image processing apparatus 101. For example, the CPU 102 acquires a command from the user via a Human Interface Device (HID) I/F (not shown), and executes various image processes in accordance with the acquired command and computer programs saved in a storage medium 104.

The RAM 103 includes an area for storing a computer program and data loaded from the storage medium 104 and an area for storing data received from an external apparatus via a data transfer I/F 106. In addition, the RAM 103 includes a work area used by the CPU 102 or an image processing accelerator 105 to execute processing. As described above, the RAM 103 can provide various areas.

The storage medium 104 is a nonvolatile memory device such as a hard disk. The storage medium 104 saves an operating system (OS), computer programs and data for causing the CPU 102 or the image processing accelerator 105 to execute various processes to be described as those performed by the image processing apparatus 101, and the like. The computer programs and data saved in the storage medium 104 are appropriately loaded into the RAM 103 under the control of the CPU 102, and are to be processed by the CPU 102 or the image processing accelerator 105.

The image processing accelerator 105 is hardware capable of executing image processing faster than the CPU 102. The image processing accelerator 105 is activated when the CPU 102 writes a parameter and data necessary for image processing at a predetermined address of the RAM 103. The image processing accelerator 105 loads the above-described parameter and data, and then executes the image processing for the data. Note that the image processing accelerator 105 is not an essential element, and the CPU 102 may execute equivalent processing. More specifically, the image processing accelerator 105 is a GPU or an exclusively designed electric circuit. The above-described parameter can be saved in the storage medium 104 or can be acquired from an external apparatus via the data transfer I/F 106. The data transfer I/F 106 is a communication interface for performing data communication with an external apparatus via the network 107.

The printing apparatus 108 will be described next. The printing apparatus 108 is an apparatus having a function of printing (recording) an image and characters on a print medium such as paper, and is, for example, a printer or a multi-function peripheral.

A CPU 111 executes various processes using computer programs and data stored in a RAM 112. This causes the CPU 111 to control the overall operation of the printing apparatus 108 and to execute or control various processes to be described as those performed by the printing apparatus 108.

The RAM 112 includes an area for storing a computer program and data loaded from a storage medium 113 and an area for storing data received from an external apparatus via a data transfer I/F 110. In addition, the RAM 112 includes a work area used by the CPU 111 or an image processing accelerator 109 to execute processing. As described above, the RAM 112 can provide various areas.

The storage medium 113 is a nonvolatile memory device such as a hard disk. The storage medium 113 saves an operating system (OS), computer programs and data for causing the CPU 111 or the image processing accelerator 109 to execute various processes to be described as those performed by the printing apparatus 108, and the like. The computer programs and data saved in the storage medium 113 are appropriately loaded into the RAM 112 under the control of the CPU 111, and are to be processed by the CPU 111 or the image processing accelerator 109.

The image processing accelerator 109 is hardware capable of executing image processing faster than the CPU 111. The image processing accelerator 109 is activated when the CPU 111 writes a parameter and data necessary for image processing at a predetermined address of the RAM 112. The image processing accelerator 109 loads the above-described parameter and data, and then executes the image processing for the data. Note that the image processing accelerator 109 is not an essential element, and the CPU 111 may execute equivalent processing. More specifically, the image processing accelerator 109 is a GPU or an exclusively designed electric circuit. The above-described parameter can be saved in the storage medium 113 or can be acquired from an external apparatus via the data transfer I/F 110. The data transfer I/F 110 is a communication interface for performing data communication with an external apparatus via the network 107.

The image processing to be performed by the CPU 111 or the image processing accelerator 109 will now be explained. This image processing is, for example, processing of generating, based on print data acquired from the image processing apparatus 101, data indicating the dot formation position of ink in each scan by a printhead 115. The CPU 111 or the image processing accelerator 109 performs color conversion processing and quantization processing for the acquired print data.

The color conversion processing is processing of performing color separation to ink concentrations to be handled by the printing apparatus 108. For example, the acquired print data contains image data indicating an image. In a case where the image data is data indicating an image in a color space coordinate system such as sRGB as the expression colors of a monitor, data indicating an image by color coordinates (R, G, B) of the sRGB is converted into ink data (CMYK) to be handled by the printing apparatus 108. The color conversion method is implemented by matrix operation processing or processing using a three-dimensional lookup table (LUT) or a four-dimensional LUT.

The printing apparatus 108 according to this embodiment uses inks of black (K), cyan (C), magenta (M), and yellow (Y) as an example. Therefore, RGB image data is converted into image data having 8-bit color information of each of K, C, M, and Y. The color information of each color corresponds to the application amount of each ink. As for the number of ink colors, four colors of K, C, M, and Y have been described as an example. However, to improve image quality, it is also possible to additionally use other ink colors such as light cyan (Lc), light magenta (Lm), and gray (Gy) having low concentrations. In this case, ink signals corresponding to the inks are generated.

After the color conversion processing, quantization processing is performed for the ink data. This quantization processing is processing of decreasing the number of tone levels of the ink data. In this embodiment, quantization is performed by using a dither matrix in which thresholds to be compared with the values of the ink data are arrayed in individual pixels. After the quantization processing, binary data indicating whether to form a dot in each dot formation position is finally generated.

After the image processing is performed, a printhead controller 114 transfers the binary data to the printhead 115. At the same time, the CPU 111 performs printing control via the printhead controller 114 so as to operate a carriage motor for operating the printhead 115, and to operate a conveyance motor for conveying a print medium. The printhead 115 scans the print medium and also discharges ink droplets onto the print medium, thereby forming an image on the print medium.

Figure 14:
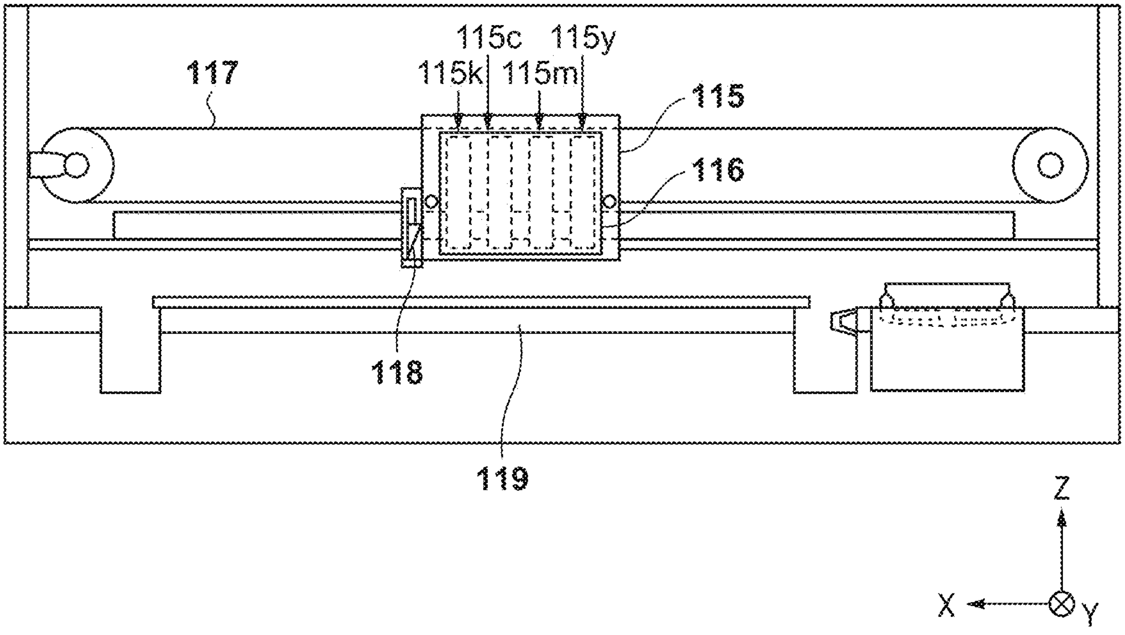
FIG. 14 is a view for explaining a printhead 115.

Assume that the printhead 115 includes print nozzle arrays (115*c*, 115*m*, 115*y*, and 115*k*) of four color inks of cyan (C), magenta (M), yellow (Y), and black (K). The printhead 115 will be described with reference to FIG. 14.

In this embodiment, an image is printed on a unit area for one nozzle array by N scans. The printhead 115 includes a carriage 116, the nozzle arrays 115*k*, 115*c*, 115*m*, and 115*y*, and an optical sensor 118. The carriage 116 on which the nozzle arrays 115*k*, 115*c*, 115*m*, and 115*y* and the optical sensor 118 are mounted can reciprocally move along the X direction (a main scan direction) in FIG. 14 by the driving force of the carriage motor transmitted via a belt 117. While the carriage 116 moves in the X direction relative to a print medium, ink droplets are discharged from each nozzle of the nozzle arrays 115*k*, 115*c*, 115*m*, and 115*y* in the gravity direction (the −Z direction in FIG. 14) based on print data. Consequently, an image is printed by 1/N of a main scan on the print medium placed on a platen 119. Upon completion of one main scan, the print medium is conveyed along a conveyance direction (the −Y direction in FIG. 14) crossing the main scan direction by a distance corresponding to the width of 1/N of the main scan. These operations print, on the print medium, an image having the width of one nozzle array by N scans. An image is gradually formed on the print medium by alternately repeating the main scan and the conveyance operation, as described above. In this way, control can be executed to complete image printing in a predetermined area.

<Overall Procedure>

The overall processing of the image processing apparatus 101 will be described with reference to a flowchart shown in FIG. 2. In this embodiment, with respect to a combination of colors subjected to color degeneration, the distance between the colors in a predetermined color space can be increased by the processing according to the flowchart shown in FIG. 2. As a result, it is possible to reduce the degree of color degeneration.

Figure 2:
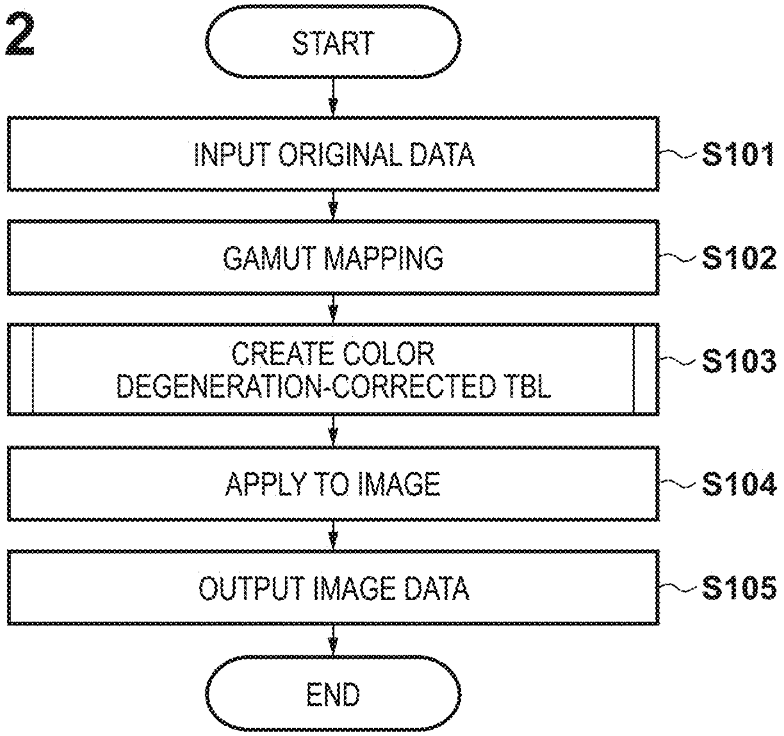
FIG. 2 is a flowchart of the overall processing of an image processing apparatus 101.

The processing according to the flowchart shown in FIG. 2 is implemented when, for example, the CPU 102 reads out a computer program saved in the storage medium 104 to the RAM 103 and executes the readout computer program. Note that part or all of the processing according to the flowchart shown in FIG. 2 may be executed by the image processing accelerator 105.

In step S101, the CPU 102 acquires, into the RAM 103, original data saved in the storage medium 104. Note that the method of acquiring original data into the RAM 103 is not limited to a specific method. For example, the CPU 102 may acquire, into the RAM 103, original data received from an external apparatus via the data transfer I/F 106.

The CPU 102 performs color information acquisition of acquiring image data (input image data) including color information from the original data acquired into the RAM 103. The image data includes, as color information, values representing a color expressed in a predetermined color space. In the color information acquisition, the values representing a color are acquired from the original data. The values representing a color are, for example, sRGB data, Adobe RGB data, CIE-L*a*b* data, CIE-LUV data, XYZ color system data, xyY color system data, HSV data, or HLS data.

In step S102, the CPU 102 performs color information conversion for the image data using color conversion information saved in advance in the storage medium 104. The color conversion information according to this embodiment is a gamut mapping table, and gamut mapping is performed for the color information of each pixel of the image data. The image data after gamut mapping is stored/saved in the RAM 103 or the storage medium 104 by the CPU 102. More specifically, the gamut mapping table is a three-dimensional lookup table. By the three-dimensional lookup table, a combination of output pixel values (Rout, Gout, Bout) can be calculated with respect to a combination of input pixel values (Rin, Gin, Bin). If each of the input pixel values Rin, Gin, and Bin has 256 tones, a table Table 1 [256][256][256][3] having 256×256×256=16,777,216 sets of output pixel values in total is preferably used as a gamut mapping table.

In this embodiment, the CPU 102 performs color conversion of the image data using the above-described gamut mapping table. More specifically, the CPU 102 acquires the image data in which each pixel has color information (Rout, Gout, Bout) by performing, for each pixel (each pixel having color information (Rin, Gin, Bin)) of the image data acquired in step S101, processing given by $$Rout = \text{Table1}[Rin][Gin][\text{Bin}][0] \quad (1)$$

$$Gout = \text{Table1}[Rin][Gin][\text{Bin}][1] \quad (2)$$

$$Bout = \text{Table1}[Rin][Gin][\text{Bin}][2] \quad (3)$$

Note that a known contrivance to reduce the table size of the gamut mapping table, such as decreasing the number of grids of the gamut mapping table from 256 to, for example, 16 and interpolating table values of a plurality of grids to decide output values, may be used.

In step S103, the CPU 102 creates a color degeneration-corrected table (TBL) using the image data acquired in step S101, the image data after gamut mapping acquired in step S102, and the gamut mapping table. The format of the color degeneration-corrected table is the same as that of the gamut mapping table. Details of the processing of step S103 will be described later.

In step S104, the CPU 102 generates corrected image data that has undergone color degeneration correction by converting the color information of the image data acquired in step S101 using the color degeneration-corrected table created in step S103. The generated corrected image data is stored/saved in the RAM 103 or the storage medium 104 by the CPU 102.

In step S105, the CPU 102 outputs the corrected image data generated in step S104 to an external apparatus via the data transfer I/F 106. For example, the CPU 102 may generate print data by converting the corrected image data into data in a print format, and output the print data to the printing apparatus 108. The gamut mapping may be mapping from the sRGB color space to the color reproduction gamut of the printing apparatus 108. In this case, it is possible to suppress decreases in chroma and color difference caused by the gamut mapping to the color reproduction gamut of the printing apparatus 108.

Figure 3:
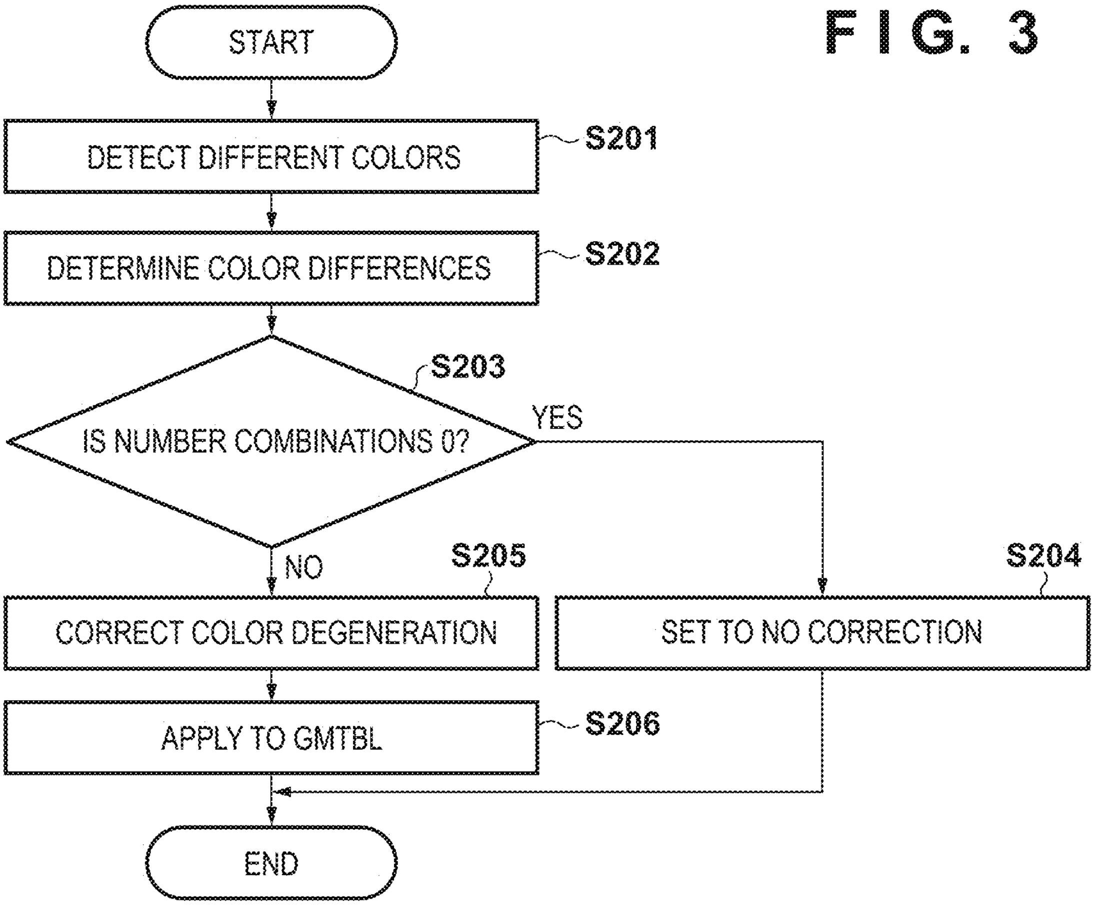
FIG. 3 is a flowchart illustrating details of processing in step S103.

Details of the processing of step S103 will be described next with reference to a flowchart shown in FIG. 3. In step S201, the CPU 102 detects unique color information held by the image data acquired in step S101, and registers the detected color information in a unique color list stored/saved in the RAM 103 or the storage medium 104. The unique color list is initialized by the CPU 102 at the start of the processing of step S201 (the unique color list is emptied).

The CPU 102 executes the color information detection processing for each pixel included in the image data. Then, the CPU 102 determines whether the color information of the pixel is different from the unique color information detected until now. If it is determined that the color information of the pixel is unique color information, the CPU 102 registers the color information of the pixel in the unique color list. As the determination method, it is determined whether the color information of a target pixel is color information included in the unique color list, and if it is determined that the color information is not included, the color information of the target pixel is registered in the unique color list. This processing makes it possible to register the unique color information included in the image data in the unique color list.

In the above description, if the image data is sRGB data, each of the input values has 256 tones, and unique color information is thus detected from 256×256×256=16,777,216 colors in total. In this case, the number of pieces of color information is enormous, thereby decreasing the processing speed. Therefore, the CPU 102 may detect the unique color information discretely. For example, the 256 tones may be reduced to 16 tones, and then unique color information may be detected. If the number of colors is reduced, color information may be reduced to the color information of the closest grid. As described above, it is possible to detect unique color information from 16×16×16=4,096 colors in total, thereby improving the processing speed.

In step S202, based on the unique color list generated in step S201, the CPU 102 detects the number of combinations of pieces of color information subjected to color degeneration, among the combinations of the pieces of color information included in the image data. The processing of step S202 will be described with reference to a schematic view shown in FIG. 4.

A color gamut 401 is the color gamut of the input image data. A color gamut 402 is the color gamut of the image data generated from the input image data by the gamut mapping in step S102. The input image data includes color information 403 and color information 404. Color information 405 is color information obtained by performing the gamut mapping for the color information 403. Color information 406 is color information obtained by performing the gamut mapping for the color information 404. In a case when a color difference 408 between the color information 405 and the color information 406 is less than a color difference 407 between the color information 403 and the color information 404, it is determined that color degeneration has occurred. The determination processing is repeated as many times as the number of combinations of the pieces of color information registered in the unique color list. As a color difference calculation method, a Euclidean distance in a color space is used. In this embodiment, a description will be made using a Euclidean distance (to be referred to as a color difference ΔE hereinafter) in the CIE-L*a*b* color space as an example. Since the CIE-L*a*b* color space is a visual uniform color space, the Euclidean distance can be approximated into the change amount of the color information. Therefore, a person perceives that the color information becomes closer as the Euclidean distance on the CIE-L*a*b* color space is less and that the color information is farther apart as the Euclidean distance is greater. The color information in the CIE-L*a*b* color space is represented in a color space with three axes of L*, a*, and b*. The color information 403 is represented by L403, a403, and b403. The color information 404 is represented by L404, a404, and b404. The color information 405 is represented by L405, a405, and b405. The color information 406 is represented by L406, a406, and b406. If the input image data is represented in another color space, it is converted into the CIE-L*a*b* color space using a known technique. The color difference 407 ($\Delta E_{407}$) and the color difference 408 ($\Delta E_{408}$) can be obtained by:

$$\Delta E_{407} = \sqrt{(L_{403} - L_{404})^2 + (a_{403} - a_{404})^2 + (b_{403} - b_{404})^2} \quad (4)$$

$$\Delta E_{408} = \sqrt{(L_{405} - L_{406})^2 + (a_{405} - a_{406})^2 + (b_{405} - b_{406})^2} \quad (5)$$

In a case when $\Delta E_{408}$ is smaller than $\Delta E_{407}$, it is determined that color degeneration has occurred. Furthermore, in a case when $\Delta E_{408}$ does not have such magnitude that a color information difference can be identified, it is determined that color degeneration has occurred. This is because if there is such color difference between the color information 405 and the color information 406 that the pieces of color information can be identified as different pieces of color information based on the human visual characteristic, it is unnecessary to correct the color difference. In terms of the visual characteristic, 2.0 may be used as the color difference ΔE with which the pieces of color information can be identified as different pieces of color information. That is, in a case when $\Delta E_{408}$ is less than $\Delta E_{407}$ and is smaller than 2.0, it may be determined that color degeneration has occurred.

In step S203, the CPU 102 determines whether "the number of combinations of pieces of color information subjected to color degeneration" that is detected in step S202 is 0. If "the number of combinations of pieces of color information subjected to color degeneration" is 0, the process advances to step S204. Otherwise, the CPU 102 determines that the image data requires color degeneration correction, and the process advances to step S205. Since the image data does not require color degeneration correction, the CPU 102 makes a setting (no correction) of excluding the image data from the target of color degeneration correction in step S204.

On the other hand, color degeneration correction changes color information. For this reason, a color change occurs even in the combinations of pieces of color information not subjected to color degeneration, and this color change is unnecessary. The necessity of color degeneration correction may be determined based on the total number of combinations of pieces of unique color information and the number of combinations of pieces of color information subjected to color degeneration. More specifically, in a case when the majority of all the combinations of the pieces of unique color information are combinations of the pieces of color information subjected to color degeneration, it may be determined that color degeneration correction is necessary. This can suppress a trouble of a color change caused by color degeneration correction.

In step S205, based on the image data, the image data after gamut mapping, and the gamut mapping table, the CPU 102 performs color degeneration correction for the combinations of the colors subjected to color degeneration. Details of the processing in step S205 will be described with reference to FIG. 4.

Figure 4:
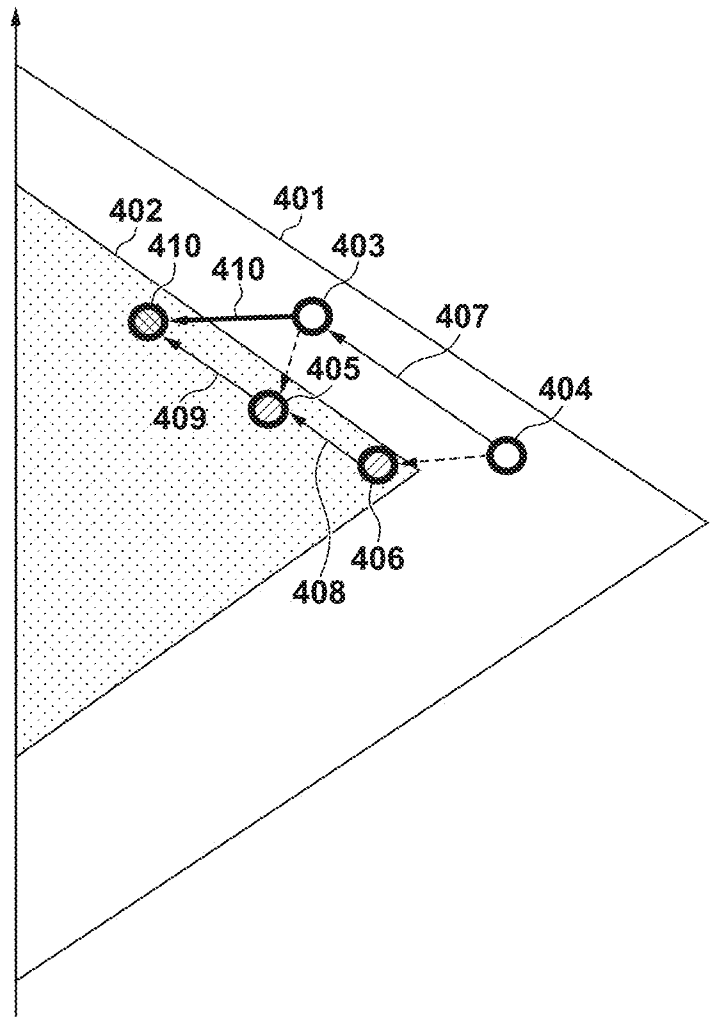
FIG. 4 is a schematic view for explaining processing in step S202.

The color information 403 and the color information 404 are pieces of input color information included in the input image data. The color information 405 is color information obtained by performing color conversion for the color information 403 by gamut mapping. The color information 406 is color information obtained by performing color conversion for the color information 404 by gamut mapping. Referring to FIG. 4, the combination of the color information 403 and the color information 404 represents color degeneration. To cope with this, color degeneration can be corrected by increasing the distance between the color information 405 and the color information 406 on the predetermined color space. More specifically, correction processing is performed to increase the distance between the colors to a distance equal to or greater than the distance with which the color information 405 and the color information 406 can be identified as different colors based on the human visual characteristic. In terms of the visual characteristic, as the distance between the colors with which the pieces of color information can be identified as different pieces of color information, ΔE is set to 2.0 or more. For example, the color difference is desirably equal to $\Delta E_{407}$. The color degeneration correction processing is repeated as many times as the number of combinations of the pieces of color information subjected to color degeneration. The result of color degeneration correction performed as many times as the number of combinations of the pieces of color information is managed by holding the color information before correction and the color information after correction in a table. In FIG. 4, the color information is color information in the CIE-L*a*b* color space. Therefore, the color information may be converted into the color spaces of the input image data and the output image data. In this case, color information before correction in the color space of the input image data and color information after correction in the color space of the output image data are held in a table.

Next, the above-described color degeneration correction will be described in detail. A color difference correction amount 409 that increases the color difference ΔE is obtained from $\Delta E_{408}$. In terms of the visual characteristic, the color difference ΔE with which the pieces of color information can be recognized as different pieces of color information is the difference between 2.0 and $\Delta E_{408}$ which is the color difference correction amount 409. For example, the difference between $\Delta E_{407}$ and $\Delta E_{408}$ is the color difference correction amount 409. The result of correcting the color information 405 by the color difference correction amount 409 on an extension from the color information 406 to the color information 405 in the CIE-L*a*b* color space is color information 410. The color information 410 is separated from the color information 406 by a color difference obtained by adding $\Delta E_{408}$ and the color difference correction amount 409. The color information 410 is on the extension from the color information 406 to the color information 405 in the above example, but this embodiment is not limited to this. As long as the color difference ΔE between the color information 406 and the color information 410 is equal to the color difference obtained by adding the color difference $\Delta E_{408}$ and the color difference correction amount 409, the direction can be any of the lightness direction, the chroma direction, and the hue angle direction in the CIE-L*a*b* color space. Not only one direction but also any combination of the lightness direction, the chroma direction, and the hue angle direction may be used. Furthermore, in the above example, color degeneration is corrected by changing the color information 405 but the color information 406 may be changed. Alternatively, both the color information 405 and the color information 406 may be corrected. If the color information 406 is corrected, the color information 406 cannot be corrected outside the color gamut 402, and thus the color information 406 is corrected (moved) to the boundary surface of the color gamut 402. Then, with respect to the shortage of the color difference ΔE, the color information 405 may be corrected, thereby performing color degeneration correction.

Next, in step S206, the CPU 102 changes the gamut mapping table (GMTBL) using the result of the color degeneration correction performed in step S205. The gamut mapping table before the change is a table for converting the color information 403 as an input color into the color information 405 as an output color. In accordance with the result of the color degeneration correction performed in step S205, the gamut mapping table is changed to a table for converting the color information 403 as an input color into the color information 410 as an output color. The Gamut mapping table change is repeated as many times as the number of combinations of the colors subjected to color degeneration.

That is, if the CPU 102 determines that a combination of the first color information included in the first area in the image data and the second color information included in the second area in the image data is a combination of pieces of color information subjected to color degeneration, the CPU 102 corrects color conversion information so that the color difference before color conversion between the first color information and the second color information and the color difference after the color conversion between the first color information and the second color information are equal to or smaller than a predetermined color difference.

With the above-described processing, by applying the color degeneration-corrected gamut mapping table to the input image data, the distance between the colors can be increased for each of the combinations of the pieces of color information subjected to color degeneration among the combinations of the pieces of unique color information included in the input image data. As a result, it is possible to reduce color degeneration with respect to the combinations of the pieces of color information subjected to color degeneration. This is because if the input image data is sRGB data, the gamut mapping table is created on the premise that the input image data has pieces of color information of 16,777,216 colors. The gamut mapping table created on this premise is created in consideration of the color degeneration and chroma even for color information that is not included in the input image data. In this embodiment, it is possible to adaptively correct the gamut mapping table with respect to the input image data by detecting the color information included in the input image data. Then, it is possible to create the gamut mapping table only for the color information included in the input image data. As a result, it is possible to perform preferred adaptive gamut mapping for the input image data, thereby reducing color degeneration.

In this embodiment, the processing in a case when the input image data includes one page has been explained. However, the input image data may include a plurality of pages. In a case when the input image data includes a plurality of pages, the processing according to the flowchart shown in FIG. 2 may be performed for all the pages. Furthermore, the processing according to the flowchart shown in FIG. 2 may be performed for each page. Thus, even if the input image data includes a plurality of pages, it is possible to reduce the degree of color degeneration caused by gamut mapping. However, if correction is performed for each page, the same processing is not always performed for identical pieces of color information. Therefore, if the pieces of color information of identical colors exist in different pages of original data, the pieces of color information may be corrected to different pieces of color information for the respective pages in accordance with colors on the periphery. If the pieces of color information are corrected to different pieces of color information, they may erroneously be recognized as pieces of color information having different meanings in the original in which each piece of color information has the meaning.

Figure 16:
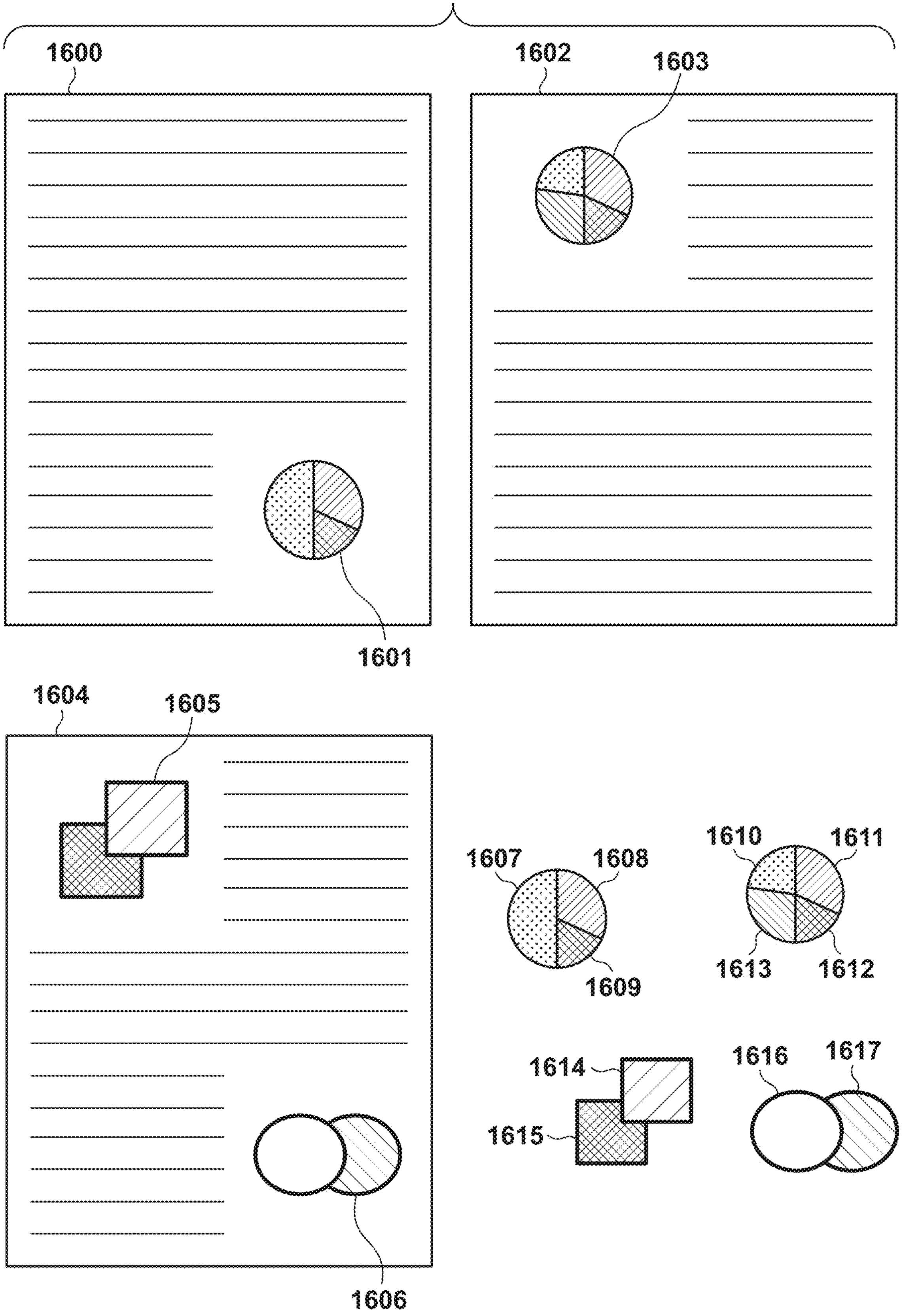
FIG. 16 is a view showing the state of original data before applying color degeneration correction to each page.
Figure 17:
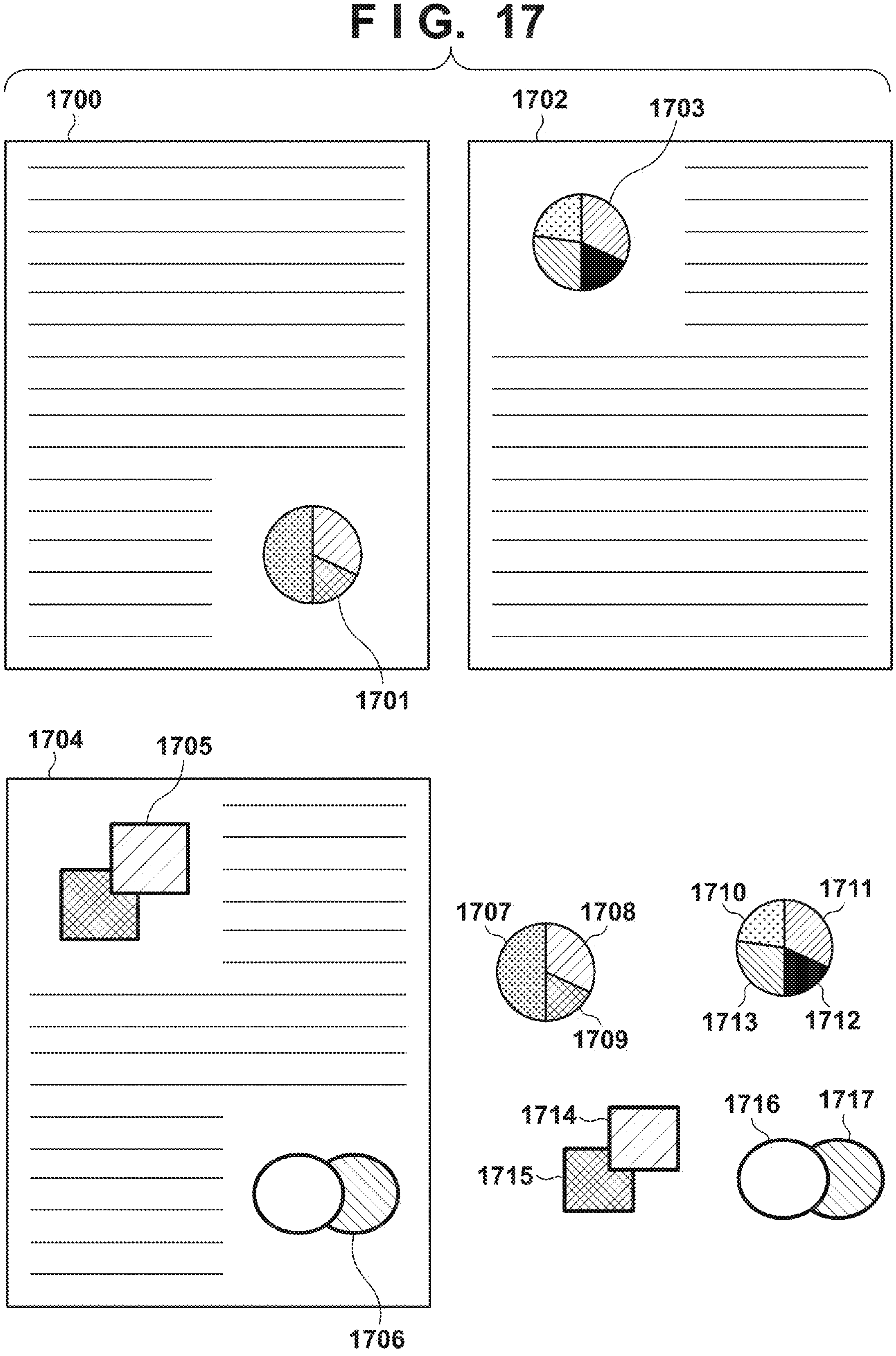
FIG. 17 is a view showing a result of applying color degeneration correction to each page.

FIG. 16 shows the state of original data before applying color degeneration correction to each page, and FIG. 17 shows the result of applying color degeneration correction to each page. Each original data includes an object having common color information. As an example, correction of objects existing in different original pages will be described.

One object is an object 1601 of a pie chart having input colors 1607, 1608, and 1609, which exists in an original page 1600. Another object is an object 1603 of a pie chart having input colors 1610, 1611, 1612, and 1613, which exists in an original page 1602.

The objects 1601 and 1603 have common input colors. The input color 1607 is identical to the input color 1610, the input color 1608 is identical to the input color 1611, and the input color 1609 is identical to the input color 1612. However, the object 1603 has the input color 1613 that does not exist in the object 1601. The results of performing color degeneration correction for the objects 1601 and 1603 are obtained as an object 1701 of a pie chart and an object 1703 and a pie chart in original pages 1700 and 1702 shown in FIG. 17, respectively. The input color 1607 in the object 1601 is corrected to an output color 1707, the input color 1608 is corrected to an output color 1708, and the input color 1609 is corrected to an output color 1709. In addition, the input color 1610 in the object 1603 is corrected to an output color 1710, the input color 1611 is corrected to an output color 1711, the input color 1612 is corrected to an output color 1712, and the input color 1613 is corrected to an output color 1713. At this time, a correction amount is decided in accordance with the distribution of the input colors. Therefore, for example, assume that the input color 1613 existing only in the object 1603 is a color close to the input color 1612, and the input color 1612 is the target of color degeneration correction. On the other hand, assume that in the object 1601, the identical input color 1609 is not the target of color degeneration correction. In this case, the input colors 1609 and 1612 before correction are identical colors but the output colors 1709 and 1712 after correction are different colors. As a result, when individually seeing the objects 1701 and 1703, the colors are corrected to appropriate values in terms of identifiability. However, if, for example, the user sets the input colors 1609 and 1612 to be identical to represent the same data even in different graphs, the fact that the output colors 1709 and 1712 are identical colors is considered to be important more than identifiability with respect to other colors. In this way, correction processing may not agree with expectation of the user. This is not limited to the input colors 1609 and 1612, and the same applies to the input colors 1607 and 1610 and the input colors 1608 and 1611. In addition, even if colors that are not completely identical colors on the data but have, for example, a difference equal to or less than ΔE of 2.0 with which the difference cannot visually be recognized exist in different areas, these colors may be corrected to extremely different colors due to a difference in color distribution between the areas, thereby causing a similar problem.

Figure 18:
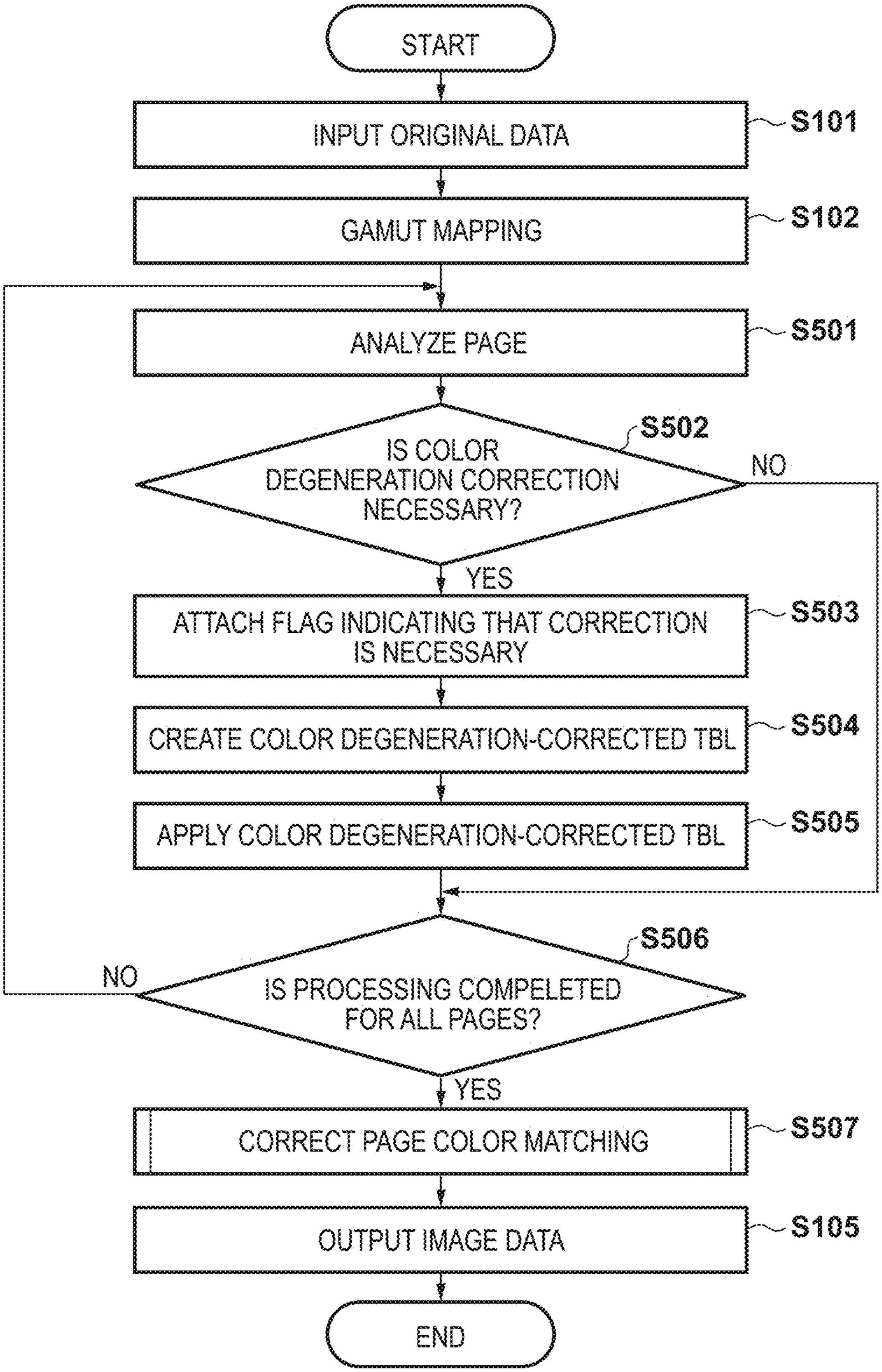
FIG. 18 is a flowchart illustrating a gamut mapping procedure.

FIG. 18 shows a gamut mapping procedure according to this embodiment. In FIG. 18, the same step numbers as in FIG. 2 denote the same processing steps and a description thereof will be omitted.

In step S501, the CPU 102 analyzes a page that has not been analyzed in the original data. In step S502, based on the result of the analysis in step S501, the CPU 102 determines whether color degeneration correction is necessary. If, as a result of the determination processing, it is determined that color degeneration correction is necessary, the process advances to step S503. Otherwise, the process advances to step S506.

In this example, as a criterion for determining that color degeneration correction is necessary, a case when color degeneration occurs as a result of performing mapping for an input color in the page or a case when color degeneration of a predetermined proportion or more occurs for an input color in the page may be used. Assume here that it is determined that color degeneration correction is necessary for all the original page 1600, the original page 1602, and an original page 1604.

In step S503, with respect to the page for which it is determined that color degeneration correction is necessary, the CPU 102 stores information (flag) indicating that color degeneration correction is necessary for the page in the RAM 103 in association with the page.

In step S504, the CPU 102 creates a color degeneration-corrected TBL for the page for which it is determined that color degeneration correction is necessary. A method of creating a color degeneration-corrected TBL is the same as in step S103 described above.

In step S505, the CPU 102 applies the color degeneration-corrected TBL created in step S504 to the page for which it is determined that color degeneration correction is necessary. In step S506, it is determined whether the analysis processing of step S501 has been performed for all the pages of the original data.

If, as a result of the determination processing, the analysis processing of step S501 has been performed for all the pages of the original data, the process advances to step S507. On the other hand, if a page for which the analysis processing of step S501 has not been performed remains in the original data, the process returns to step S501.

Figure 19:
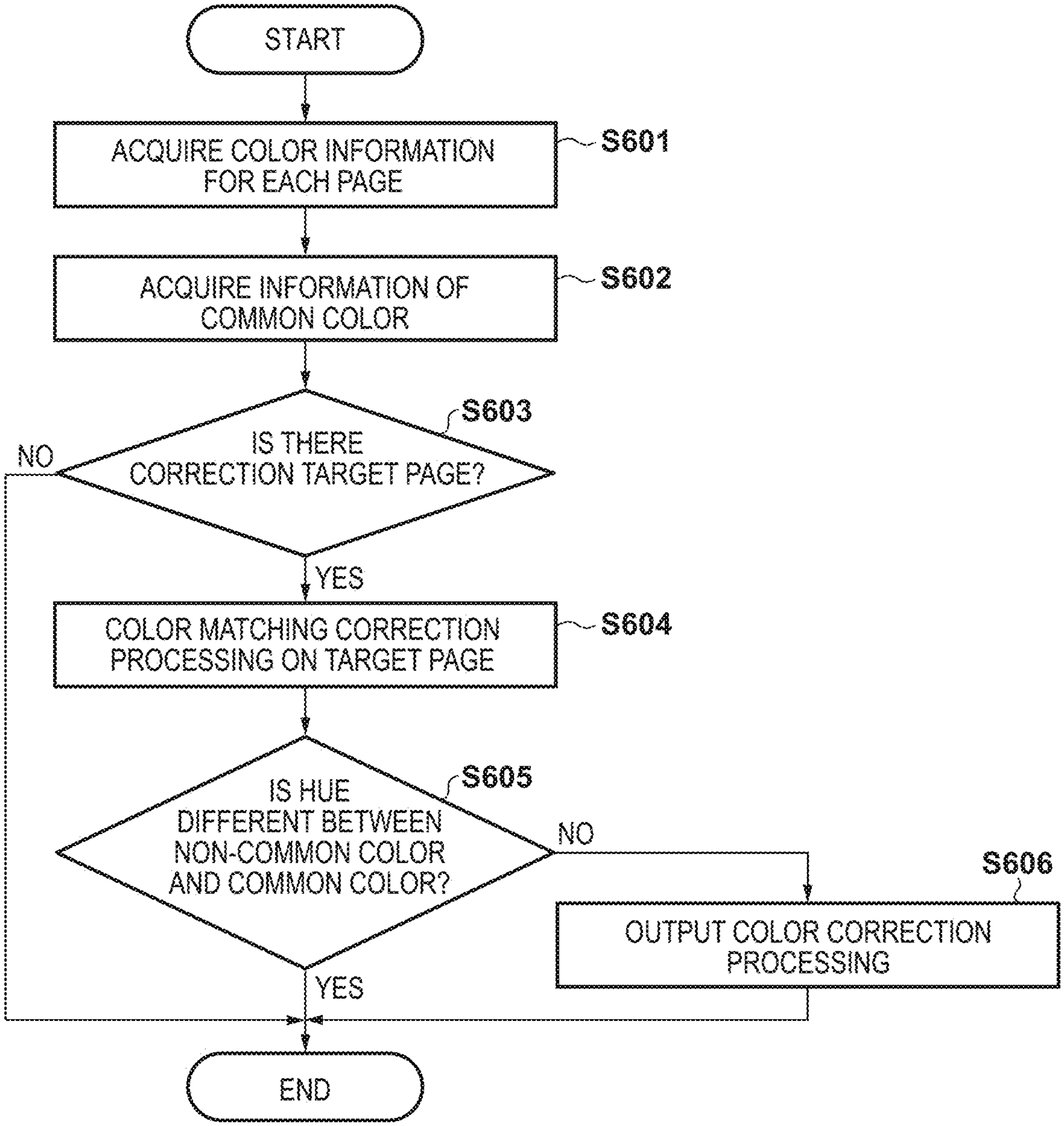
FIG. 19 is a flowchart illustrating details of processing in step S903.

In step S507, the CPU 102 performs color matching correction for the page for which it is determined that color degeneration correction is necessary. Details of the processing in step S507 will be described with reference to a flowchart shown in FIG. 19.

In FIG. 16, the object 1601 exists in the original page 1600, the object 1603 exists in the original page 1602, and objects 1605 and 1606 exist in the original page 1604. In step S503, information indicating that color degeneration correction is necessary for the original pages 1600, 1602, and 1604 is saved in the RAM 103.

In step S601, with respect to the page having undergone color degeneration correction, the CPU 102 acquires the input color information of the page. More specifically, the CPU 102 acquires information of the input color, the output color, and the hue angle of the input color of each page having undergone color degeneration correction. FIG. 20 shows an example of a list of the pieces of information acquired for each page in step S601.

A table 2001 shows a list of pieces of information acquired from the original page 1600, a table 2002 shows a list of pieces of information acquired from the original page 1602, and a table 2003 shows a list of pieces of information acquired from the original page 1604.

With the acquisition processing in step S601, the pieces of information of the input colors (input), the output colors (output), and the hue angles are confirmed. Pieces of information shown in a tab "whether color is common color" and a tab "common color" are decided in steps after step S601.

In step S602, the CPU 102 determines whether there exists a color common to another page among the input colors in each page having undergone color degeneration correction. The common color may indicate completely identical colors or colors with a color difference equal to or smaller than a predetermined color difference. An example of calculation of the color difference will be described below.

As a color difference calculation method, a Euclidean distance in a color space is used. In this embodiment, a Euclidean distance (to be referred to as the color difference ΔE hereafter) in the CIE-L*a*b* color space is used as an example. Since the CIE-L*a*b* color space is a visual uniform color space, a numerical color change or difference on the CIE-L*a*b* color space can be approximated into a change that can be recognized by the human eye. The input color 1607 as one of the input colors of the original page 1600 and the input color 1610 as one of the input colors of the original page 1602 will be exemplified.

On the CIE-L*a*b* color space, the input color 1607 is represented by L1607, a1607, and b1607, and the input color 1610 is represented by L1610, a1610, and b1610. A color difference $\Delta E_{1611}$ between the input colors 1607 and 1610 can be obtained by:

$$\Delta E_{1611} = \sqrt{(L_{1607} - L_{1610})^2 + (a_{1607} - a_{1610})^2 + (b_{1607} - b_{1610})^2} \quad (6)$$

If $\Delta E_{1611}$ is 0, the input colors 1607 and 1610 are completely identical colors, and are determined as the common color. Alternatively, if the color difference $\Delta E_{1611}$ does not have such magnitude that the color difference can be identified, the input colors 1607 and 1611 cannot be recognized as different colors by the human eye, and can thus be determined as the common color. In terms of the visual characteristic, 2.0 is used as the color difference ΔE with which the colors can be identified as different colors. That is, in a case when the color difference $\Delta E_{1611}$ falls within a range of 0 (inclusive) to 2.0 (inclusive), the colors are determined as the common color. In this example, there exist three common colors between the original pages 1600 and 1602, there exists one common color between the original pages 1600 and 1604, and there exists one common color between the original pages 1602 and 1604. FIG. 20 shows an example of the information obtained by this processing.

In the table 2001, information representing whether the corresponding input color is the common color is indicated in the tab "whether color is common color", and information representing a specific input color that is common to the input color is indicated in the tab "common color".

In step S603, the CPU 102 determines whether there exists a color matching correction target page. If no common colors exist, it is determined that there is no color matching correction target page, and the process advances to step S105. On the other hand, if common colors exist, it is determined that there exists a color matching correction target page, and the process advances to step S604.

As a criterion for determining a color matching correction target, for example, a page including a predetermined number or more of common colors may be determined as a target while determining that a page including only one common color has low relevance. Alternatively, if the degree of similarity of the histogram of the color in the page is equal to or higher than a predetermined value, the page may be determined as a color matching target.

In step S604, the CPU 102 performs color matching correction for a color degeneration-corrected page of the page including the common colors. In the example shown in FIG. 16, the original pages 1600, 1602, and 1604 are targets, and the original page 1700, the original page 1702, and an original page 1704 as outputs are to undergo color matching correction.

Note that there exist the object 1605 including input colors 1614 and 1615 and the object 1606 including input colors 1616 and 1617 in the original page 1604. The results of performing color degeneration correction for the objects 1605 and 1606 are obtained as objects 1705 and 1706 in the original page 1704 shown in FIG. 17, respectively. The input color 1614 is corrected to an output color 1714, the input color 1615 is corrected to an output color 1715, the input color 1616 is corrected to an output color 1716, and the input color 1617 is corrected to an output color 1717.

A practical example of a correction method will now be described. In this example, there exist three common color combinations of the input colors 1607 and 1610, the input colors 1608 and 1611, and the input colors 1609, 1612, and 1615.

The output colors of the input colors 1607 and 1610 are the output colors 1707 and 1710, respectively, and these two output colors are corrected so that the color difference between the two output colors is equal to or smaller than a predetermined color difference. In this embodiment, as an example, correction is performed to obtain the color difference ΔE equal to or less than 2.0 with which the colors can be identified as different colors. At this time, as a criterion for moving the colors close to each other, the input color 1607, the input color 1610, or the average value of the input colors 1607 and 1610 may be used. This processing is performed for all the common color combinations. By performing this processing, the relationship between another output color that is not a common color and the output color that is a common color may change, thereby reducing the effect of color degeneration correction in some cases. To cope with this, the hues of the common color and the output color that is not the common color are acquired. If the hues are equal, a direction in which the output color that is the common color moves on the color space by color matching correction is acquired as a vector, and the output color that is not the common color is multiplied by the vector on the color space. This maintains the relative positional relationship between the common color and the output color on the color space, thereby making it possible to suppress reduction of the effect of color degeneration correction.

With the above-described processing, while maintaining the relationship between the output colors existing in each page as much as possible, the input colors recognized as identical colors are corrected to the output colors recognized as identical colors. As a result, it is possible to correct colors to those that are recognized as identical colors even in different pages in an original in which each color has the meaning while suppressing a decrease in identifiability between the output colors existing in each page as much as possible.

Figure 21:
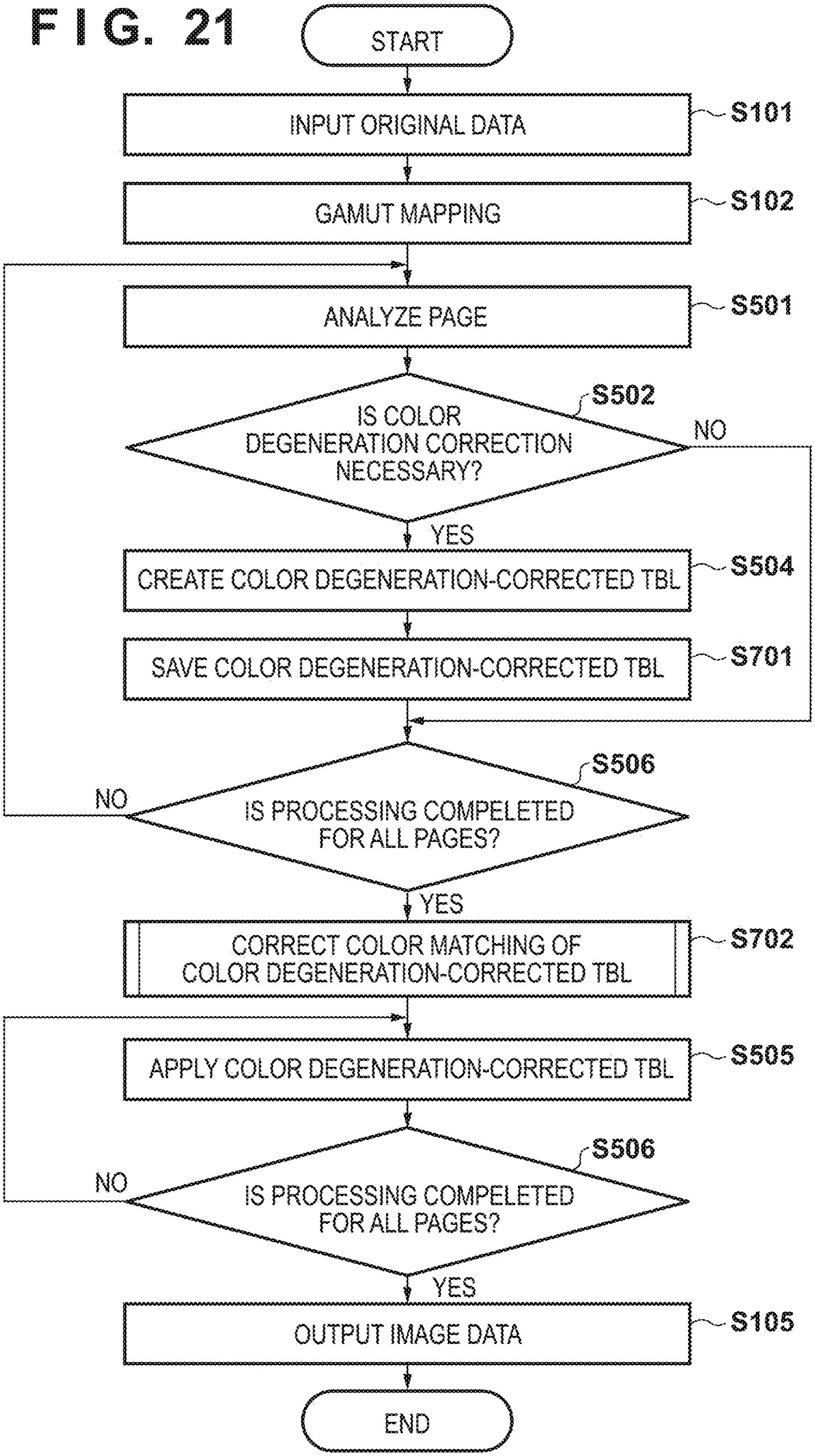
FIG. 21 is a flowchart illustrating the overall processing of the image processing apparatus when color matching correction of a color degeneration correction TBL is performed.

Note that, in this embodiment, determination processing is performed for each page of an original and correction is performed for the page. However, determination processing may be performed for a color degeneration-corrected TBL generated for each page, and color matching correction may be performed for the TBL. FIG. 21 is a flowchart of processing in this case. In FIG. 21, the same step numbers as in FIGS. 2 and 18 denote the same processing steps and a description thereof will be omitted.

In step S701, the CPU 102 stores/saves the color degeneration-corrected TBL created in step S503 in the RAM 103 or the storage medium 104. If, as a result of the determination processing in step S506, the analysis processing of step S501 has been performed for all the pages of the original data, the process advances to step S702. On the other hand, if a page for which the analysis processing of step S501 has not been performed remains in the original data, the process returns to step S501.

Figure 22:
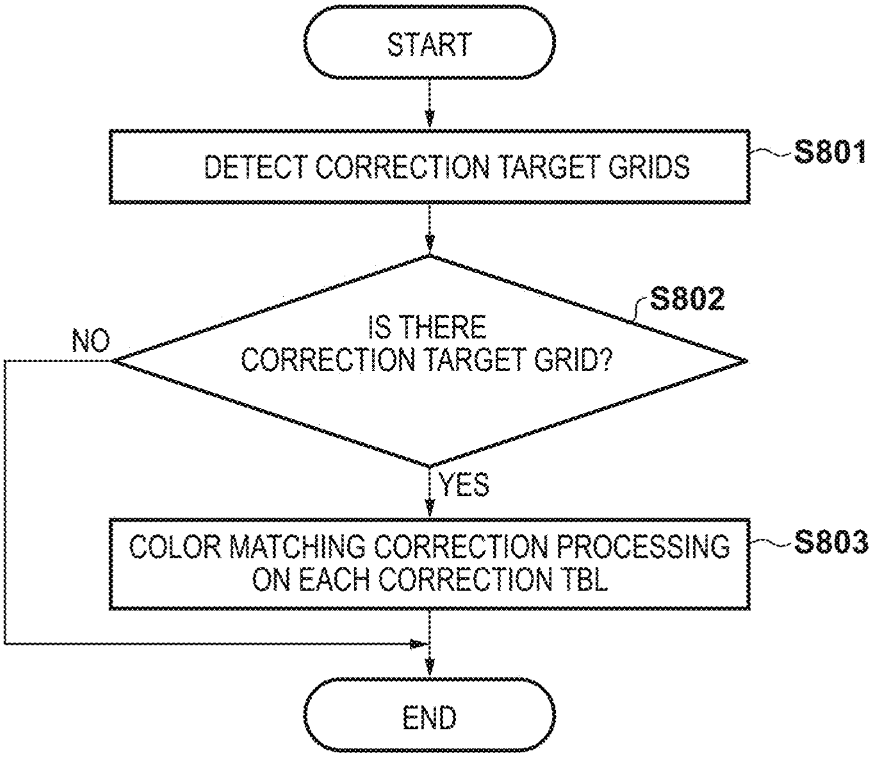
FIG. 22 is a flowchart illustrating details of processing in step S702.

In step S702, the CPU 102 performs color matching correction for the color degeneration-corrected TBL. Details of the processing in step S702 will be described with reference to a flowchart shown in FIG. 22.

In step S801, the CPU 102 detects correction target grids in the color degeneration-corrected TBL. Since the grids are common to all the color degeneration-corrected TBLs, identical grids of the color degeneration-corrected TBLs that have different output values are detected as correction target grids.

In step S802, the CPU 102 determines whether there exist correction target grids. As a criterion for the determination processing, a case when the color difference between output colors of different color degeneration-corrected TBLs is equal to or less than a predetermined color difference may be used. If the output colors are slightly different from each other, the grids may be set as target grids. If, as a result of the determination processing, there exist correction target grids, the process advances to step S803; otherwise, the process advances to step S505.

In step S803, the CPU 102 performs color matching correction for the color degeneration-corrected TBLs. A practical processing method will be described. For common grids of the different color degeneration-corrected TBLs that have different output colors, correction is performed so that the color difference between the output colors becomes equal to or less than a predetermined color difference. In this embodiment, as an example, correction is performed so that the color difference ΔE becomes equal to or less than 2.0 with which the colors can be identified as different colors. At this time, as a criterion for moving the colors close to each other, either of the color degeneration-corrected TBLs may be used. Alternatively, the average value of the color degeneration-corrected TBLs may be used.

Figure 15:
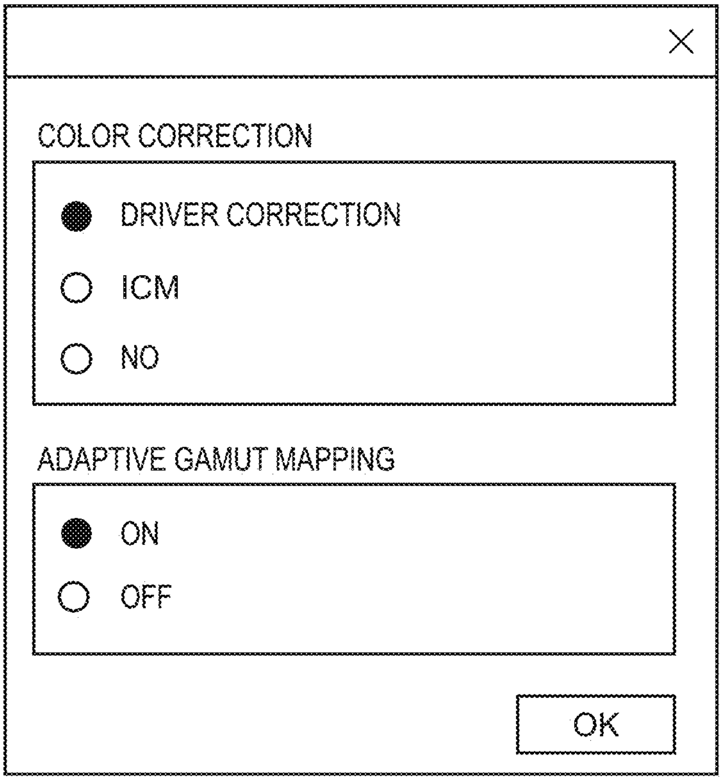
FIG. 15 is a view showing a display example of a GUI.

A Graphical User Interface (GUI) exemplified in FIG. 15 may be displayed on a display screen (not shown) of the image processing apparatus 101 to allow various settings concerning correction in accordance with a user operation. The user operation on the GUI is input when, for example, the user operates a user interface such as a keyboard, mouse, and touch panel connected to the image processing apparatus 101.

In "color correction", radio buttons for making it possible to make a setting for performing driver correction (first row), a setting for performing ICM correction (second row), and a setting for performing no correction (third row) are provided, and a setting corresponding to the radio button instructed in accordance with a user operation is made.

In "adaptive gamut mapping", radio buttons for making it possible to make a setting for performing gamut mapping (first row) and a setting for performing no gamut mapping (second row) are provided, and a setting corresponding to the radio button instructed in accordance with a user operation is made.

Note that the arrangement of the GUI, the setting contents, the setting method, the operation method of the GUI, the device that displays the GUI, and the like are merely examples, and are not intended to limit the scope of the present invention.

Second Embodiment

In each of the following embodiments including this embodiment, the difference from the first embodiment will be described and each embodiment is assumed to be the same as the first embodiment, unless it is specifically stated otherwise. In the above-described first embodiment, color degeneration correction is performed for each color. Therefore, depending on a combination of pieces of color information of input image data, the degree of color degeneration is reduced but a tint may change. More specifically, in a case when color degeneration correction is performed for two pieces of color information having different hue angles, if the color information is changed by changing the hue angle, the tint may be different from the tint of the color information in input image data. If, for example, color degeneration correction is performed for blue and purple by changing the hue angle, purple changes to red. If the tint changes, this may cause the user to recall a failure of an apparatus such as an ink discharge failure.

In the above-described first embodiment, color degeneration correction is repeated as many times as the number of combinations of the pieces of unique color information of the input image data. Therefore, it is possible to reliably increase the distance between the pieces of color information. However, in a case when the number of combinations of pieces of unique color information of the input image data increases, as a result of changing the color information to increase the distance between the pieces of color information, the distance between the changed color information and another unique color information may be decreased. To cope with this, the CPU 102 needs to repeatedly perform color degeneration correction in step S205 so as to have expected distances between pieces of color information with respect to all the combinations of the pieces of unique color information of the input image data. Since, however, the amount of processing of increasing the distance between pieces of color information is enormous, the processing time increases. In this embodiment, color degeneration correction is performed in the same correction direction for every predetermined hue angle by setting a plurality of pieces of unique color information as one color information group. To perform correction by setting a plurality of pieces of unique color information as one color information group, unique color information as a reference is selected from the color information group. By limiting the correction direction to the lightness direction, it is possible to suppress a change of a tint. By performing correction by setting the plurality of pieces of unique color information as one color information group, it is unnecessary to perform processing for all the combinations of the pieces of color information of input image data, thereby reducing the processing time.

Figure 5:
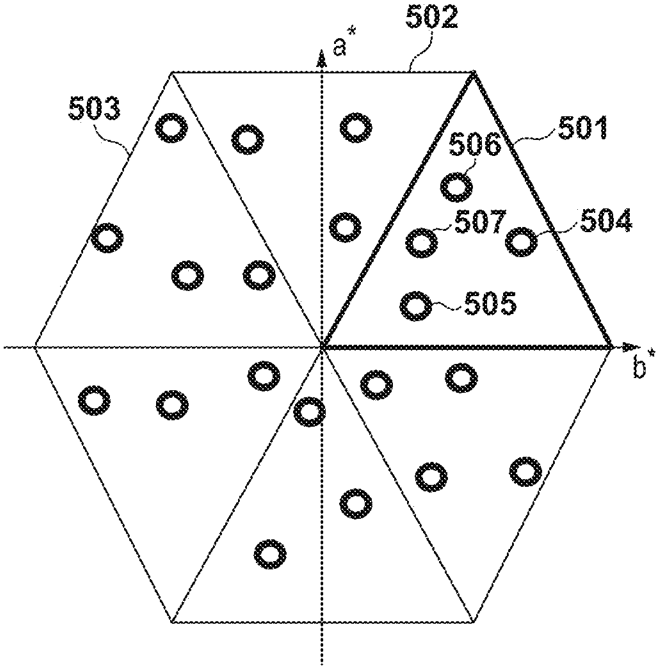
FIG. 5 is a schematic view for explaining color degeneration determination processing.

FIG. 5 is a schematic view for explaining color degeneration determination processing according to this embodiment, and is a view showing, as a plane (a*b* plane), two axes of the a* axis and the b* axis in the CIE-L*a*b* color space. A hue range 501 indicates a range within which a plurality of pieces of unique color information within the predetermined hue angle are set as one color information group. Referring to FIG. 5, since a hue angle of 360° is divided by 6, the hue range 501 indicates a range of 0° to 60°. The hue range is preferably a hue range within which colors can be recognized as identical colors. For example, the hue angle in the CIE-L*a*b* color space is decided in a unit of 30° to 60°. If the hue angle is decided in a unit of 60°, six colors of red, green, blue, cyan, magenta, and yellow can be divided. If the hue angle is decided in a unit of 30°, division is possible by color information between the pieces of color information divided in a unit of 60°. The hue range may be decided fixedly, as shown in FIG. 5. Alternatively, the hue range may be decided in accordance with the unique color information included in the input image data. A CPU 102 detects the number of combinations of pieces of color information subjected to color degeneration by the above-described processing with respect to the combinations of the pieces of unique color information of the input image data within the hue range 501. Referring to FIG. 5, color information 504, color information 505, color information 506, and color information 507 indicate input colors. In FIG. 5, it is determined whether color degeneration has occurred for combinations of the four pieces 504, 505, 506, and 507 of color information. This processing is repeated for all the hue ranges. As described above, the number of combinations of the pieces of color information subjected to color degeneration can be detected for each hue range. In FIG. 5, six combinations of the pieces of color information subjected to color degeneration are detected. In this embodiment, the hue range is decided for every hue angle of 60° but the present invention is not limited to this. For example, the hue range may be decided for every hue angle of 30° or the hue range may be decided without equally dividing the angle. For example, the hue angle range is decided as a hue range so as to obtain visual uniformity. Pieces of color information in the same color information group are visually perceived as identical pieces of color information, and thus it is possible to perform color degeneration correction for the identical pieces of color information. Furthermore, the number of combinations of the pieces of color information subjected to color degeneration may be detected for each hue range within two hue ranges including an adjacent hue range.

Figure 6:
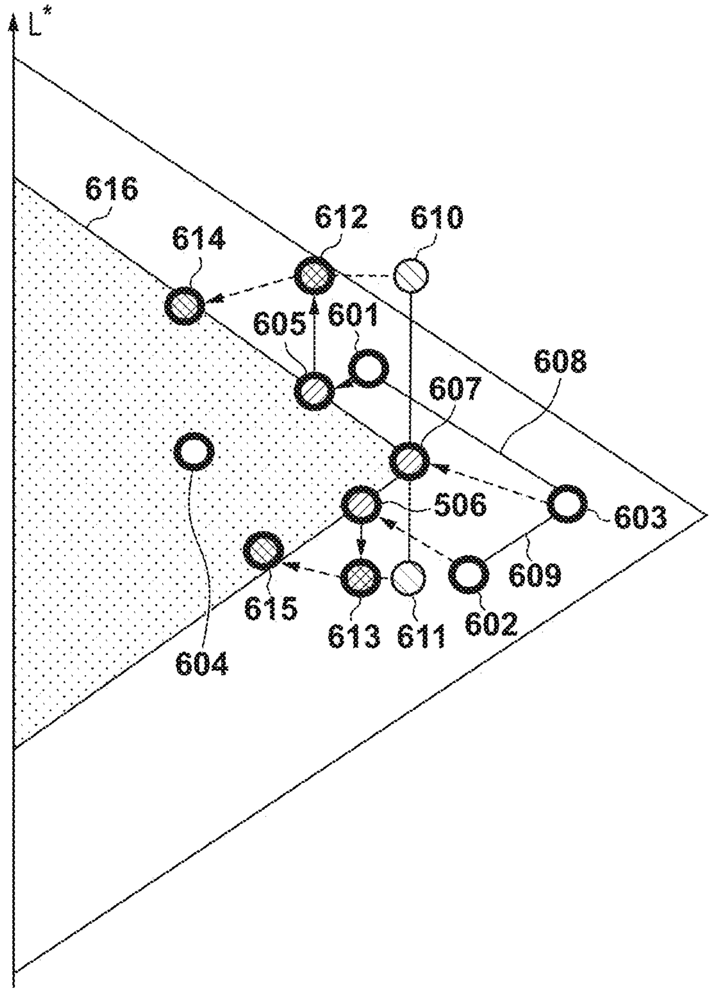
FIG. 6 is a schematic view for explaining the color degeneration determination processing.

FIG. 6 is a schematic view for explaining the color degeneration correction processing according to this embodiment. FIG. 6 is a view showing, as a plane, two axes of the L* axis and the C* axis in the CIE-L*a*b* color space. L* represents lightness and C* represents chroma. In FIG. 6, color information 601, color information 602, color information 603, and color information 604 are input colors. The color information 601, the color information 602, the color information 603, and the color information 604 indicate pieces of color information included in the hue range 501 (hue angle range) in FIG. 5. Color information 605 is color information obtained after performing color conversion for the color information 601 by gamut mapping. Color information 606 is color information obtained after performing color conversion for the color information 602 by gamut mapping. Color information 607 is color information obtained after performing color conversion for the color information 603 by gamut mapping. Color information obtained after performing color conversion for the color information 604 by gamut mapping indicates the same color information.

First, the CPU 102 decides unique color information as the reference of the color degeneration correction processing for each hue range. As an example, the maximum lightness color, the minimum lightness color, and the maximum chroma color are decided as reference colors. In FIG. 6, the color information 601 is the maximum lightness color, the color information 602 is the minimum lightness color, and the color information 603 is the maximum chroma color.

Next, the CPU 102 calculates, for each hue range, a correction ratio R from the number of combinations of the pieces of unique color information and the number of combinations of the pieces of color information subjected to color degeneration within the target hue range. As an example, a calculation formula is given by:

correction ratio $R$=number of combinations of pieces of color information subjected to color degeneration/number of combinations of pieces of unique color information The correction ratio R is lower as the number of combinations of the pieces of color information subjected to color degeneration is smaller, and is higher as the number of combinations of the pieces of color information subjected to color degeneration is greater. As described above, as the number of combinations of the pieces of color information subjected to color degeneration is greater, color degeneration correction can be performed more strongly. FIG. 6 shows an example in which there are four colors within the hue range 501 in FIG. 5. Therefore, there are six combinations of the pieces of unique color information. Among the six combinations, there are four combinations of the pieces of color information subjected to color degeneration. In this case, the correction ratio R is 0.667. In FIG. 6, color degeneration has occurred for all the combinations due to gamut mapping. However, even after gamut mapping, if the color difference is greater than the identifiable smallest color distance, the combination of the pieces of color information is not included as the combination of pieces of color information subjected to color degeneration. Thus, the combination of the color information 604 and the color information 603 and the combination of the color information 604 and the color information 602 are not included as the combinations of pieces of color information subjected to color degeneration. The identifiable least color difference ΔE is 2.0.

Next, the CPU 102 calculates, for each hue range, a correction amount based on the correction ratio R and pieces of color information of the maximum lightness, the minimum lightness, and the maximum chroma. The CPU 102 calculates, as correction amounts, a correction amount Mh on a side brighter than the maximum chroma color and a correction amount Ml on a side darker than the maximum chroma color.

The color information 601 as the maximum lightness color is represented by L601, a601, and b601. The color information 602 as the minimum lightness color is represented by L602, a602, and b602. The color information 603 as the maximum chroma color is represented by L603, a603, and b603. As an example, the correction amount Mh is a value obtained by multiplying the color difference ΔE between the maximum lightness color and the maximum chroma color by the correction ratio R. As an example, the correction amount Ml is a value obtained by multiplying the color difference ΔE between the maximum chroma color and the minimum lightness color by the correction ratio R. Calculation formulas of the correction amounts Mh and Ml are given by:

$$Mh=\sqrt{(L_{501}-L_{503})^2+(a_{501}-a_{503})^2+(b_{501}-b_{503})^2}\times R \tag{7}$$

$$Ml=\sqrt{(L_{502}-L_{503})^2+(a_{502}-a_{503})^2+(b_{502}-b_{503})^2}\times R \tag{8}$$

As described above, the color difference ΔE to be held after gamut mapping can be calculated. The color difference ΔE to be held after gamut mapping is the color difference ΔE before gamut mapping. In FIG. 6, the correction amount Mh is a value obtained by multiplying a color difference $\Delta E_{608}$ by the correction ratio R, and the correction amount Ml is a value obtained by multiplying a color difference $\Delta E_{609}$ by the correction ratio R. Furthermore, if the color difference ΔE before gamut mapping is greater than the identifiable least color difference, the color difference ΔE to be held need only be greater than the identifiable least color difference ΔE. By performing the processing in this way, it is possible to recover the color difference ΔE, that has decreased due to gamut mapping, to the identifiable color difference ΔE. The color difference ΔE to be held may be the color difference ΔE before gamut mapping. In this case, it is possible to make identifiability close to that before gamut mapping. The color difference ΔE to be held may be greater than the color difference before gamut mapping. In this case, it is possible to improve identifiability, as compared with identifiability before gamut mapping.

Next, the CPU 102 generates a color degeneration-corrected table for each hue range. The color degeneration-corrected table is a correction table for expanding lightness in the lightness direction based on the lightness of the maximum chroma color and the correction amounts Mh and Ml. In FIG. 6, the lightness of the maximum chroma color is lightness L603 of the color information 603. The correction amount Mh is the color difference $\Delta E_{608}$. The correction amount Ml is the color difference $\Delta E_{609}$. A method of creating a table for expanding lightness in the lightness direction will be described below.

Figure 7:
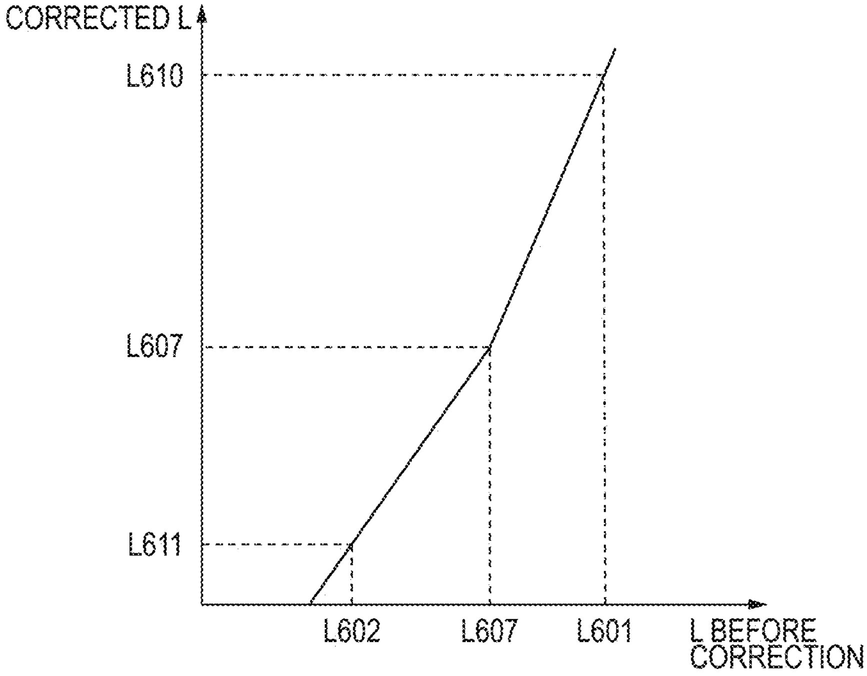
FIG. 7 is a view showing a correction table for expanding lightness in the lightness direction.

The correction table for expanding lightness in the lightness direction is a 1D LUT (one-dimensional lookup table). Lightness before correction is input, and lightness after correction is output. The lightness after correction is decided based on minimum lightness after correction, the lightness of the maximum chroma color after gamut mapping, and maximum lightness after correction. The maximum lightness after correction is lightness obtained by adding the correction amount Mh to the lightness of the maximum chroma color. The minimum lightness after correction is lightness obtained by subtracting the correction amount Ml from the lightness of the maximum chroma color after gamut mapping. The table for expanding lightness in the lightness direction is created by linearly changing the minimum lightness after correction to the lightness of the maximum chroma color after gamut mapping and linearly changing the lightness of the maximum chroma color after gamut mapping to the minimum lightness after correction. In FIG. 6, the maximum lightness before correction is the lightness L601 of the color information 601 as the maximum lightness color. The minimum lightness before correction is the lightness L602 of the color information 602 as the minimum lightness color. The lightness of the maximum chroma color after gamut mapping is lightness L607 of the color information 607. The maximum lightness after correction is lightness L610 obtained by adding the color difference $\Delta E_{608}$ as the correction amount Mh to the lightness L607. The minimum lightness after correction is lightness L611 obtained by subtracting the color difference 609 as the correction amount Ml from the lightness L607. FIG. 7 shows a correction table for expanding lightness in the lightness direction in FIG. 6. In this embodiment, as an example, color degeneration correction is performed by converting the color difference ΔE into the lightness difference. Sensitivity to the lightness difference is high because of the visual characteristic. Therefore, by converting the chroma difference into a lightness difference, it is possible to make the user feel the color difference ΔE despite a small lightness difference because of the visual characteristic. In addition, the lightness difference is less than the chroma difference because of the relationship between the sRGB color gamut and the color gamut of the printing apparatus 108. Therefore, it is possible to effectively use the narrow color gamut by conversion into a lightness difference. In this embodiment, as an example, the lightness of the maximum chroma color is not changed. As described above, since the color with the maximum chroma is not changed, it is possible to correct the color difference ΔE while maintaining the chroma. Correction of a value greater than the maximum lightness and a value less than the minimum lightness may be undefined since these values are not included in the input image data. If the correction table is interpolated and used, a value greater than the maximum lightness and a value less than the minimum lightness are also referred to, and thus a value may be set to obtain a linear change, as shown in FIG. 7. As described above, it is possible to decrease the number of grids of the correction table to reduce the capacity, and to reduce the processing time taken to transfer the correction table.

If the maximum lightness after correction exceeds the maximum lightness of the color gamut after gamut mapping, the CPU 102 performs maximum value clip processing. The maximum value clip processing subtracts the difference between the maximum lightness after correction and the maximum lightness of the color gamut after gamut mapping in the whole correction table. In this case, the lightness of the maximum chroma color after gamut mapping is also changed to the low lightness side. As described above, if the pieces of unique color information of the input image data are localized to the high lightness side, it is possible to improve the color difference ΔE by using the lightness tone on the low lightness side. If the minimum lightness after correction is lower than the minimum lightness of the color gamut after gamut mapping, the CPU 102 performs minimum value clip processing. The minimum value clip processing adds the difference between the minimum lightness after correction and the minimum lightness of the color gamut after gamut mapping in the whole correction table. As described above, if the pieces of color information of the input image data are localized to the low lightness side, it is possible to reduce color degeneration by using the lightness tone on the high lightness side.

Next, the CPU 102 applies, to the gamut mapping table, the color degeneration-corrected table created for each hue range. First, based on color information held by the output color of the gamut mapping, the CPU 102 decides the color degeneration-corrected table of a specific hue angle to be applied. For example, if the hue angle of the output color of the gamut mapping is 25°, the CPU 102 applies the color degeneration-corrected table of the hue range 501 shown in FIG. 5. Then, the CPU 102 applies the decided color degeneration-corrected table to the output value of the gamut mapping table to perform correction. The CPU 102 sets the color information after correction as a new output color after the gamut mapping.

As described above, the color degeneration-corrected table created based on the reference color is also applied to color information other than the reference color, thereby limiting the correction direction to the lightness direction and thus suppressing a change of a tint. Furthermore, it is unnecessary to perform color degeneration correction processing for all the combinations of pieces of unique color information of the input image data, thereby making it possible to reduce the processing time.

In addition, in accordance with the hue angle of the output color of the gamut mapping, the color degeneration-corrected tables of adjacent hue ranges may be blended. For example, if the hue angle of the output color of the gamut mapping is Hn°, the color degeneration-corrected table of the hue range 501 and that of a hue range 502 are blended. More specifically, the lightness value of the output color after the gamut mapping is corrected by the color correction table of the hue range 501 to obtain a lightness value Lc501. The lightness value of the output color after the gamut mapping is corrected by the color correction table of the hue range 502 to obtain a lightness value Lc502. The intermediate hue angle of the hue range 501 is a hue angle H501, and the intermediate hue angle of the hue range 502 is a hue angle H502. The corrected lightness value Lc501 and the corrected lightness value Lc502 are interpolated by the hue angle of the output value after the gamut mapping. Lc is obtained by:

$$Lc = \left|\frac{Hn - H_{501}}{H_{502} - H_{501}}\right| \times Lc_{501} + \left|\frac{Hn - H_{502}}{H_{502} - H_{501}}\right| \times Lc_{502} \qquad (9)$$

As described above, by blending the color degeneration-corrected tables to be applied, in accordance with the hue angle, it is possible to suppress a sudden change of correction intensity caused by a change of the hue angle. If the color space of the color information after correction is different from the color space of the output color after gamut mapping, the color space is converted and set as the output color after gamut mapping. For example, if the color space of the color information after correction is the CIE-L*a*b* color space, a search is performed to obtain an output color after gamut mapping.

If the value after correction exceeds the color gamut after gamut mapping, mapping to the color gamut after gamut mapping is performed. As an example, a mapping method is color difference minimum mapping that focuses on lightness and hue. In color difference minimum mapping that focuses on lightness and hue, the color difference ΔE is calculated by equation (10) below. Color information of a color exceeding the color gamut in the CIE-L*a*b* color space is represented by Ls, as, and bs. Color information of a color within the color gamut after gamut mapping is represented by Lt, at, and bt. ΔL represents a lightness difference, ΔC represents a chroma difference, and ΔH represents a hue difference. In addition, Wl represents a weight of lightness, Wc represents a weight of chroma, Wh represents a weight of a hue angle, and ΔEw represents a weighted color difference. At this time, the weighted color difference ΔEw is obtained by equations (11) to (14) below.

$$\Delta E = \sqrt{(L_s - L_t)^2 + (a_s - a_t)^2 + (b_s - b_t)^2} \qquad (10)$$

$$\Delta L = \sqrt{(L_s - L_t)^2} \qquad (11)$$

$$\Delta C = \sqrt{(a_s - a_t)^2 + (b_s - b_t)^2} \qquad (12)$$

$$\Delta H = \Delta E - (\Delta L + \Delta C) \qquad (13)$$

$$\Delta Ew = Wl \times \Delta L + Wc \times \Delta C + \mathrm{Wh} \times \Delta H \qquad (14)$$

Since the color difference ΔE is expanded in the lightness direction, it is possible to more correctly perform color degeneration correction by performing mapping by focusing on lightness more than chroma. That is, the weight Wl of lightness is greater than the weight Wc of chroma. Furthermore, since hue largely influences a tint, it is possible to minimize a change of the tint before and after correction by performing mapping by focusing on hue more than lightness and chroma. That is, the weight Wh of hue is equal to or greater than the weight Wl of lightness, and is greater than the weight Wc of chroma. As described above, it is possible to correct the color difference ΔE while maintaining a tint.

Furthermore, the color space may be converted at the time of performing color difference minimum mapping. It is known that in the CIE-L*a*b* color space, a color change in the chroma direction does not obtain the same hue. Therefore, if a change of the hue angle is suppressed by increasing the weight of hue, mapping to a color of the same hue is not performed. Thus, the color space may be converted into a color space in which the hue angle is bent so that the color change in the chroma direction obtains the same hue. As described above, by performing color difference minimum mapping by weighting, it is possible to suppress a change of a tint. Referring to FIG. 6, the color information 605 obtained after performing gamut mapping for the color information 601 is corrected to color information 612 by the color degeneration-corrected table. Since the color information 612 exceeds a color gamut 616 after gamut mapping, the color information 612 is mapped to the color gamut 616. The color information 612 is mapped to color information 614. As a result, with respect to the gamut mapping table after correction, if the color information 601 is input, the color information 614 is output.

In this embodiment, the color degeneration-corrected table is created for each hue range. The color degeneration-corrected table may be created by combining with that of the adjacent hue range. More specifically, within a hue range obtained by combining the hue ranges 501 and 502 in FIG. 5, the number of combinations of pieces of color information subjected to color degeneration is detected. Next, within a hue range obtained by combining the hue range 502 and a hue range 503, the number of combinations of pieces of color information subjected to color degeneration is detected. By performing detection by overlapping each hue range, it is possible to suppress a sudden change of the number of combinations of pieces of color information subjected to color degeneration, at the time of crossing the hue ranges. In this case, a hue range is preferably a hue angle range obtained by combining two hue ranges, within which pieces of color information can be recognized as identical pieces of color information. For example, the hue angle in the CIE-L*a*b* color space is 30°. That is, one hue angle range is 15°. This can suppress a sudden change of correction intensity over hue ranges.

In this embodiment, the color difference ΔE is corrected in the lightness direction by setting a plurality of pieces of unique color information as one color information group. As the visual characteristic, sensitivity to the lightness difference varies depending on chroma. Sensitivity to the lightness difference of low chroma is higher than sensitivity to the lightness difference of high chroma. Therefore, the correction amount in the lightness direction may be controlled by a chroma value. Correction is performed so that the correction amount is low for low chroma, and is performed by the above-described correction amount for high chroma. More specifically, when applying the color degeneration-corrected table to the gamut mapping table, the lightness value Ln before correction and the lightness value Lc after correction are internally divided by a chroma correction ratio S, as given by equation (16) below. Based on a chroma value Sn of the output color after gamut mapping and a maximum chroma value Sm of the color gamut after gamut mapping at the hue angle of the output color after gamut mapping, the chroma correction ratio S is calculated, as given by equation (15) below.

$$S = Sn/Sm \tag{15}$$

$$Lc' = S \times Lc + (1 - S) \times \mathrm{Ln} \tag{16}$$

Furthermore, the correction amount may be set to zero in a low-chroma color gamut. With this arrangement, it is possible to suppress a color change around a gray axis. As described above, since color degeneration correction can be performed in accordance with the visual sensitivity, it is possible to suppress excessive correction.

Third Embodiment

In the above-described second embodiment, color degeneration correction is performed for each hue range. Therefore, if the pieces of color information of the input image data have different hue angles and the lightness difference after gamut mapping is small, identifiability may decrease. For high chroma and different hue angles, even after gamut mapping, the distance between pieces of color information that is enough to identify the pieces of color information is maintained. However, if the lightness difference is small, it is difficult to identify the pieces of color information. In this embodiment, if a lightness difference after gamut mapping is smaller than a predetermined color difference ΔE, it is possible to suppress a decrease in identifiability by performing correction to increase the lightness difference.

Color degeneration determination processing according to this embodiment will be described. In step S202 according to this embodiment, based on a unique color list generated in step S201, a CPU 102 detects the number of combinations of pieces of color information subjected to color degeneration, among combinations of pieces of unique color information included in image data. The processing of step S202 according to this embodiment will be described with reference to a schematic view shown in FIG. 8.

Figure 8:
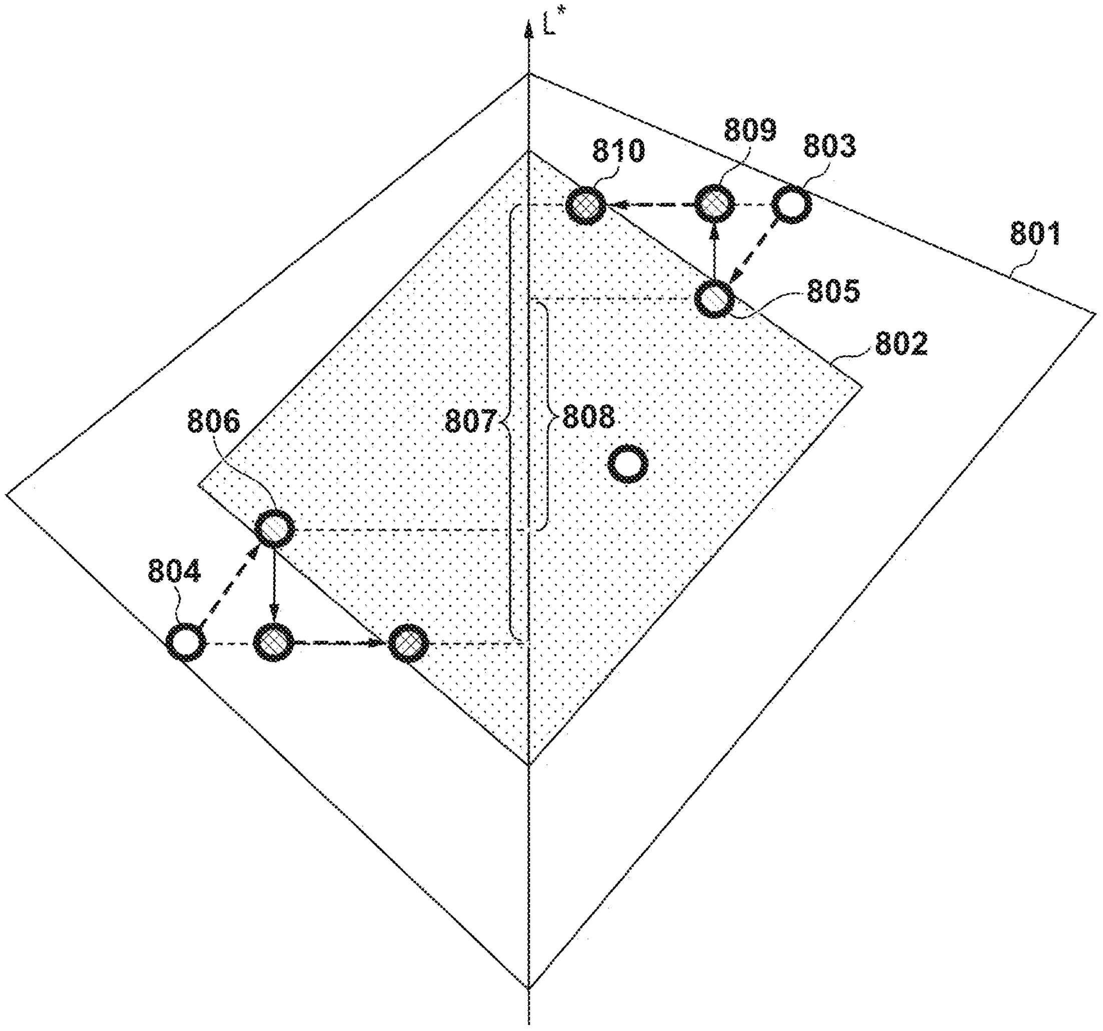
FIG. 8 is a schematic view for explaining processing in step S202.

The ordinate in FIG. 8 represents lightness L in the CIE-L*a*b* color space. The abscissa represents a projection on an arbitrary hue angle plane. A color gamut 801 is the color gamut of input image data. A color gamut 802 is a color gamut after gamut mapping in step S102. Color information 803 and color information 804 are included in the input image data. Color information 805 is color information obtained after performing color conversion for the color information 803 by gamut mapping. Color information 806 is color information obtained after performing color conversion for the color information 804 by gamut mapping. If a lightness difference 808 between the color information 805 and the color information 806 is smaller than a lightness difference 807 between the color information 803 and the color information 804, it is determined that the lightness difference decreases. The processing is repeated as many times as the number of combinations of pieces of unique color information included in the image data. In an example, as a lightness difference calculation method, a lightness difference in the CIE-L*a*b* color space is calculated. The color information in the CIE-L*a*b* color space is represented in a color space with three axes of L*, a*, and b*. The color information 803 is represented by L803, a803, and b803. The color information 804 is represented by L804, a804, and b804. The color information 805 is represented by L805, a805, and b805. The color information 806 is represented by L806, a806, and b806. If the input image data is represented in another color space, it is converted into the CIE-L*a*b* color space using a known technique. Lightness differences ΔL807 and ΔL808 are calculated by:

$$\Delta L_{807} = \sqrt{(L_{803} - L_{804})^2} \tag{17}$$

$$\Delta L_{808} = \sqrt{(L_{805} - L_{806})^2} \tag{18}$$

In a case when the lightness difference ΔL808 is less than the lightness difference ΔL807, it is determined that the lightness difference decreases. Furthermore, in a case when the lightness difference ΔL808 does not have such magnitude that a color difference can be identified, it is determined that color degeneration has occurred. This is because if there is such lightness difference between the color information 805 and the color information 806 that the pieces of color information can be identified as different colors based on the human visual characteristic, it can be determined that it is unnecessary to correct the lightness difference. In terms of the visual characteristic, 0.5 may be used as the lightness difference ΔL with which the pieces of color information can be identified as different colors. That is, in a case when the lightness difference ΔL808 is less than the lightness difference ΔL807 and is less than 0.5, it may be determined that the lightness difference decreases.

Color degeneration correction processing of step S205 according to this embodiment will be described next with reference to FIG. 8. The CPU 102 calculates a correction ratio T from the number of combinations of pieces of unique color information in the input image data and the number of combinations of pieces of color information with the decreased lightness difference. As an example, a calculation formula is given by:

correction ratio *T*=number of combinations of pieces of color information with decreased lightness difference/number of combinations of pieces of unique color information The correction ratio T is lower as the number of combinations of the pieces of color information with the decreased lightness difference is fewer, and is higher as the number of combinations of the pieces of color information with the decreased lightness difference is greater. As described above, as the number of combinations of the pieces of color information with the decreased lightness difference is larger, color degeneration correction can be performed more strongly.

Next, lightness difference correction is performed based on the correction ratio T and lightness before gamut mapping. Lightness Lc after lightness difference correction is obtained by internally dividing lightness Lm before gamut mapping and lightness Ln after gamut mapping by the correction ratio T. A calculation formula is given by:

$$Lc = T \times (Lm - \mathrm{Ln}) + \mathrm{Ln}$$

The above lightness difference correction processing is repeated as many times as the number of pieces of unique color information in the input image data. Referring to FIG. 8, lightness difference correction is performed for the lightness L803 of the color information 803 and the lightness L805 of the color information 805 by the correction ratio T. As a result, color information 809 is obtained. Since the color information 809 falls outside the color gamut after gamut mapping, the above-described search is executed to perform mapping to color information 810 within the color gamut after gamut mapping. The same processing is performed for the color information 804. As described above, it is possible to perform, for a color included in the image data, gamut mapping that increases the lightness difference, thereby reducing the degree of color degeneration caused by gamut mapping.

This embodiment may be performed simultaneously with the second embodiment. In this case, the lightness difference correction processing is performed for a reference color of color degeneration correction processing. Along with correction of the lightness difference of the reference color, lightness difference correction of other color information can also be processed. As described above, it is possible to reduce color degeneration and a decrease in the lightness difference caused by gamut mapping, and also to reduce a change of a tint.

Fourth Embodiment

In each of the above-described first, second, and third embodiments, processing is performed for the whole input image data. Among pieces of color information included in the input image data, some identical pieces of color information have different meanings. For example, color information used in a graph and color information used as part of gradation have different meanings in identification. For color information used in a graph, it is important to distinguish the color information from other color information in the graph, and it is thus necessary to perform color degeneration correction strongly. However, for color information used as part of gradation, tonality with pieces of color information of surrounding pixels is important, and it is thus necessary to perform color degeneration correction weakly. The two pieces of color information may be identical pieces of color information and undergo correction at the same time. In this case, if color degeneration correction of the color information in the graph is focused on, color degeneration correction is performed strongly, and tonality in gradation degrades. On the other hand, if tonality in gradation is focused on, color degeneration correction is performed weakly, and identifiability of the color information in the graph degrades. In addition, the number of combinations of pieces of unique color information that reduce the degree of color degeneration becomes large, and the reduction effect lowers. This is conspicuous in a case when the input image data includes a plurality of pages and color degeneration correction processing is performed for the plurality of pages. Even if the input image data includes one page, color degeneration correction processing is performed for the entire page, thereby causing the same problem.

In this embodiment, by setting a plurality of areas even for a plurality of pages, it is possible to perform color degeneration correction processing individually for each area. Then, the color degeneration correction processing of target color information can be performed with appropriate correction intensity in accordance with pieces of color information on the periphery. As described above, color information in a graph can be corrected by focusing on identifiability, and color information in gradation can be corrected by focusing on tonality.

Figure 9:
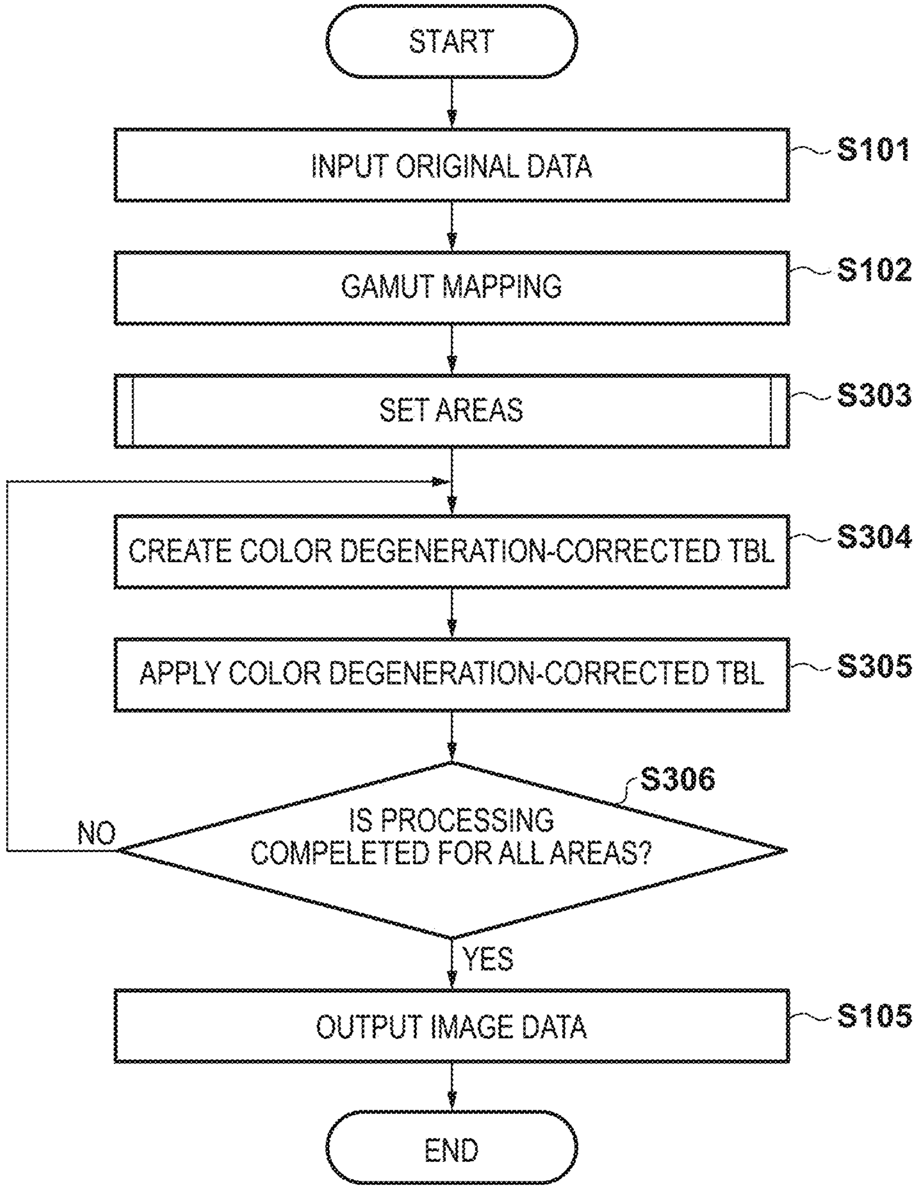
FIG. 9 is a flowchart of a series of processes of performing color degeneration correction for each area after setting areas in a single page.

FIG. 9 is a flowchart illustrating a series of processes of performing color degeneration correction for each area after setting areas in a single page. A procedure for performing processing is shown. Note that, in FIG. 9, the same step numbers as in FIG. 2 denote the same processing steps and a description thereof will be omitted.

In step S303, a CPU 102 sets areas in input image data. Details of step S303 will be described later. In step S304, the CPU 102 selects, as a selected area, an unselected area among the areas set in step S303, and creates the above-described color degeneration-corrected TBL for the selected area. In step S305, the CPU 102 applies, to the selected area, the color degeneration-corrected TBL created for the selected area in step S304, thereby performing correction.

In step S306, the CPU 102 determines whether all the areas set in step S303 have been selected as selected areas. If, as a result of the determination processing, all the areas set in step S303 have been selected as selected areas, the process advances to step S105. On the other hand, if, among the areas set in step S303, there remains an area that has not been selected as a selected area, the process advances to step S304.

Figure 10:
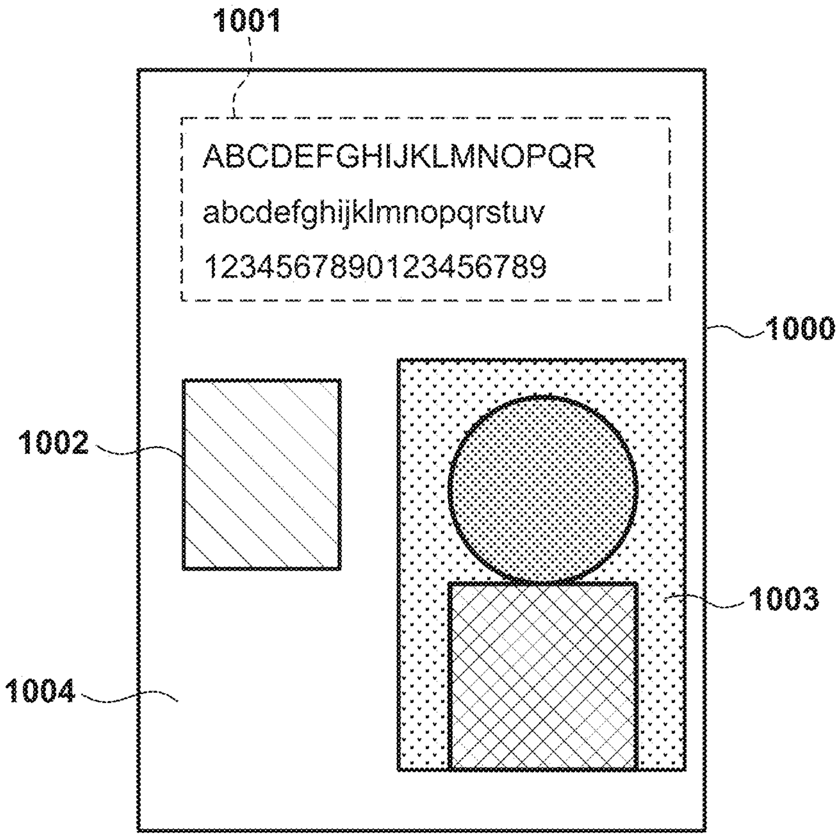
FIG. 10 is a view for explaining an example of a page of input image data input in step S101.

The above area setting processing in step S303 will be described in detail. FIG. 10 is a view for explaining an example of a page of the image data input in step S101 of FIG. 9. Assume here that data (document data) of a page 1000 exemplified in FIG. 10 is described in PDL. PDL is an abbreviation for Page Description Language, and is formed by a set of drawing instructions on a page basis. The types of drawing instructions are defined for each PDL specification. In this embodiment, the following three types are used as an example.

Instruction (1) TEXT drawing instruction (X1, Y1, color, font information, character string information);

Instruction 2) BOX drawing instruction (X1, Y1, X2, Y2, color, paint shape); and Instruction 3) IMAGE drawing instruction (X1, Y1, X2, Y2, image file information).

In some cases, drawing instructions such as a DOT drawing instruction for drawing a dot, a LINE drawing instruction for drawing a line, and a CIRCLE drawing instruction for drawing a circle are used as needed in accordance with the application purpose. For example, general PDL such as Portable Document Format (PDF) proposed by Adobe®, XPS proposed by Microsoft®, or HP-GL/2 proposed by HP® may be used.

The page 1000 in FIG. 10 represents one page, and as an example, the number of pixels is 600 horizontal pixels×800 vertical pixels. An example of PDL corresponding to the document data of the page 1000 in FIG. 10 is shown below.

```
<PAGE=001>
<TEXT>50,50,550,100,BLACK,STD-
18,"ABCDEFGHIJKLMNOPQR"</TEXT>
<TEXT>50,100,550,150,BLACK,STD-18,"abcdefghijklmnopqrstuv"</TEXT>
<TEXT>50,150,550,200,BLACK,STD-18,"1234567890123456789"</TEXT>
<BOX>50,350,200,550,GRAY,STRIPE</BOX>
<IMAGE>250,300,580,700,"PORTRAIT.jpg"</IMAGE>
</PAGE>
```

<PAGE-001> is a tag representing the number of pages in this embodiment. Normally, since the PDL is designed to be able to describe a plurality of pages, a tag representing a page break is described in the PDL. In this example, the section up to </PAGE> represents the first page. In this embodiment, this corresponds to the page 1000 in FIG. 10. If the second page exists, <PAGE=002> is described next to the above PDL.

The section from <TEXT> of the second row to </TEXT> of the third row is drawing instruction 1, and this corresponds to the first row of an area 1001 in FIG. 10. The first two coordinates represent the coordinates (X1, Y1) at the upper left corner of the drawing area, and the following two coordinates represent the coordinates (X2, Y2) at the lower right corner of the drawing area. The subsequent description shows that the color is BLACK (black: R=0, G=0, B=0), the character font is "STD" (standard), the character size is 18 points, and the character string to be described is "ABCDEFGHIJKLMNOPQR".

The section from <TEXT> of the fourth row to </TEXT> of the fifth row is drawing instruction 2, and this corresponds to the second row of the area 1001 in FIG. 10. The first four coordinates and two character strings represent the drawing area, the character color, and the character font, like drawing instruction 1, and it is described that the character string to be described is "abcdefghijklmnopqrstuv".

The section from <TEXT> of the sixth row to </TEXT> of the seventh row is drawing instruction 3, and this corresponds to the third row of the area 1001 in FIG. 10. The first four coordinates and two character strings represent the drawing area, the character color, and the character font, like drawing instruction 1 and drawing instruction 2, and it is described that the character string to be described is "1234567890123456789".

The section from <BOX> to </BOX> of the eighth row is drawing instruction 4, and this corresponds to an area 1002 in FIG. 10. The first two coordinates represent the upper left coordinates (X1, Y1) at the drawing start point, and the following two coordinates represent the lower right coordinates (X2, Y2) at the drawing end point. Next, the color is GRAY (gray: R=128, G=128, B=128), and STRIPE (stripe pattern) is designated as the paint shape. In this embodiment, as for the direction of the stripe pattern, lines in the forward diagonal direction are used. The angle or period of lines may be designated in the BOX instruction.

Next, an IMAGE instruction from <IMAGE> to </IMAGE> of the ninth and 10th rows corresponds to an area 1003 in FIG. 10. The first two coordinates represent the upper left coordinates (X1, Y1) at the drawing start point, and the following two coordinates represent the lower right coordinates (X2, Y2) at the drawing end point. Subsequently, it is described that the file name of the image existing in the area 1003 is "PORTRAIT.jpg". This indicates that the file is a JPEG file that is a popular image compression format. Then, </PAGE> described in the 11th row indicates that the drawing of the page ends.

There is a case when an actual PDL file integrates "STD" font data and a "PORTRAIT.jpg" image file in addition to the above-described drawing instruction group. This is because if the font data and the image file are separately managed, the character portion and the image portion cannot be formed only by the drawing instructions, and information needed to form the image shown in FIG. 10 is insufficient. In addition, an area 1004 in FIG. 10 is an area where no drawing instruction exists, and is blank.

In an original page described in PDL, like the page 1000 shown in FIG. 10, the area setting processing in step S303 of FIG. 9 can be implemented by analyzing the above PDL. More specifically, in the drawing instructions, the start points and the end points of the drawing Y-coordinates are as follows, and these continue from the viewpoint of areas.

| Drawing instruction | Y start point | Y end point |
|---|---|---|
| First TEXT instruction | 50 | 100 |
| Second TEXT instruction | 100 | 150 |
| Third TEXT instruction | 150 | 200 |
| BOX instruction | 350 | 550 |
| IMAGE instruction | 300 | 700 |

In addition, it is found that both the BOX instruction and the IMAGE instruction are apart from the TEXT instructions by 100 pixels in the Y direction. Next, in the BOX instruction and the IMAGE instruction, the start points and the end points of the drawing X-coordinates are as follows, and it is found that these are apart by 50 pixels in the X direction.

| Drawing instruction | X start point | X end point |
|---|---|---|
| BOX instruction | 50 | 200 |
| IMAGE instruction | 250 | 580 |

Thus, three areas can be set as follows.

| Area | X start point | Y start point | X end point | Y end point |
|---|---|---|---|---|
| First area | 50 | 50 | 550 | 200 |
| Second area | 50 | 350 | 200 | 550 |
| Third area | 250 | 300 | 580 | 700 |

Figure 11:
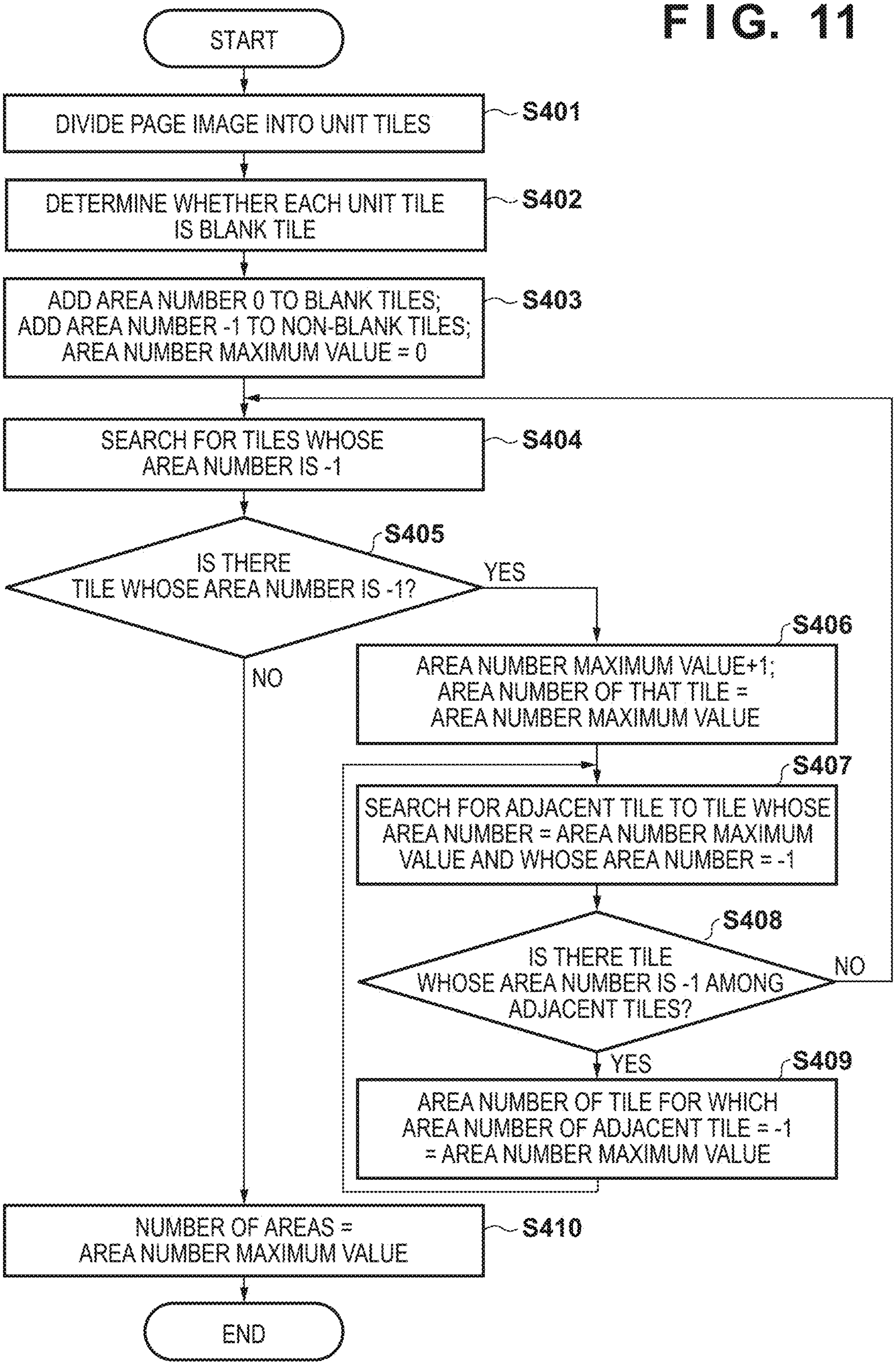
FIG. 11 is a flowchart illustrating processing of performing area setting processing in step S103 on a tile basis.

Not only the configuration for thus analyzing PDL and performing area setting but also a configuration for performing area setting using a drawing result may be employed. The configuration will be described below. FIG. 11 is a flowchart illustrating processing of performing the area setting processing in step S303 on a tile basis.

In step S401, the CPU 102 divides a page into a plurality of unit tiles. This embodiment assumes that the page is divided into "unit tiles each having a size of 30 pixels in each of the vertical and horizontal directions" but the size of the unit tile is not limited to a specific size.

First, the CPU 102 sets an array Area_number [20][27] for holding an area number set for each unit tile. The page includes 600 pixels×800 pixels, as described above. The unit tiles each having a size of 30 pixels in each of the vertical and horizontal directions include 20 unit tiles in the horizontal (X) direction×27 unit tiles in the vertical (Y) direction.

Figure 12:
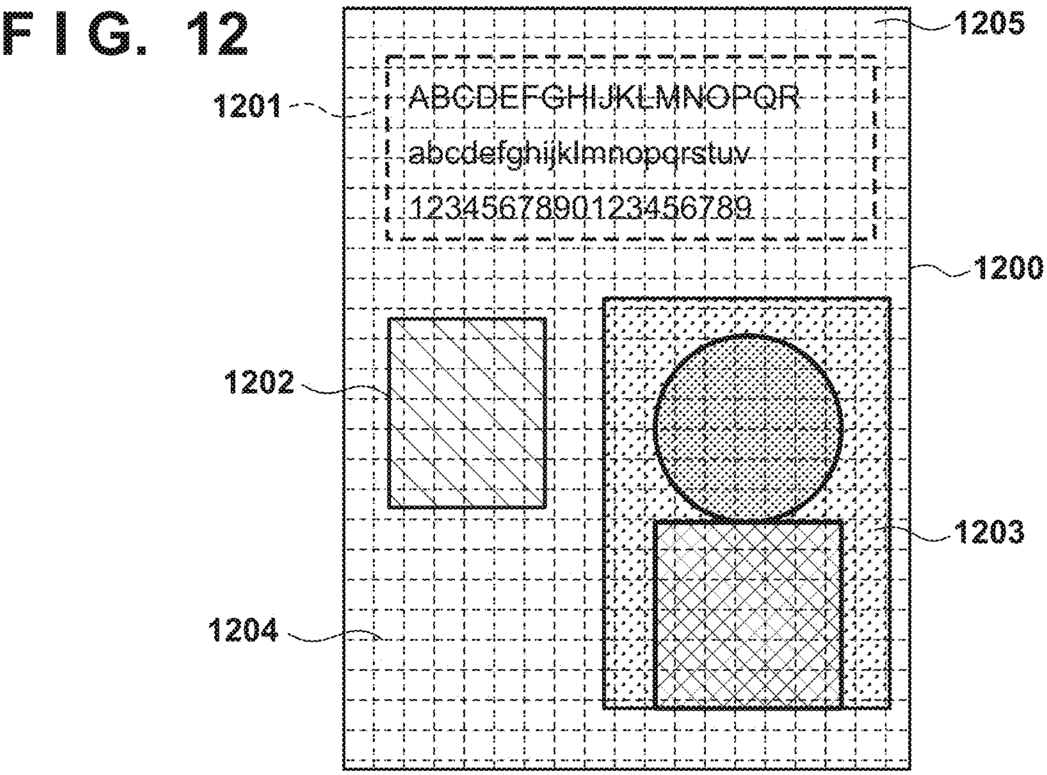
FIG. 12 is a view showing an image of tile setting of a page.

FIG. 12 is a view showing an image of tile setting of the page according to this embodiment. A page 1200 in FIG. 12 represents the whole page. An area 1201 in FIG. 12 is an area drawn in accordance with a TEXT drawing instruction, an area 1202 is an area drawn in accordance with a BOX drawing instruction, an area 1203 is an area drawn in accordance with an IMAGE drawing instruction, and an area 1204 is an area in which none are drawn.

In step S402, the CPU 102 determines, for each unit tile, whether the unit tile is a blank tile. This determination may be done based on the start point and the end point of the X- and Y-coordinates in a drawing instruction, as described above, or may be done by detecting, as a blank tile, a tile in which all pixel values in the actual unit tile are R=G=B=255. Whether to determine based on the drawing instruction or determine based on the pixel values may be decided based on the processing speed and the detection accuracy. In step S403, the CPU 102 sets the initial values of the values as follows.

Area number "0" is set for a unit tile determined as a blank tile in step S402.

Area number "−1" is set for a unit tile that is not determined as a blank tile (that is determined as a non-blank tile) in step S402.

Here, "0" is set to the area number maximum value.

More specifically, the setting is done in the following way.

Blank tile (x1, y1): area_number [x1][y1]=0;

Non-blank tile (x2, y2): area_number [x1][y1]=−1; and

Area number maximum value: max_area_number=0.

That is, at the time of completion of the processing of step S403, each of all the unit tiles is set with an area number of "0" or "−1". In step S404, the CPU 102 searches for a unit tile whose area number is "−1". More specifically, by determining whether area_number [x][y]=−1 is satisfied for the ranges of x=0 to 19 and y=0 to 26, the CPU 102 searches for, as a blank tile, a unit tile corresponding to the set of x and y satisfying area_number [x][y]=−1. Upon detecting a unit tile with the area number "−1" for the first time, the process advances to step S405.

In step S405, the CPU 102 determines whether a unit tile set with the area number "−1" exists. If, as a result of the determination processing, a unit tile set with the area number "−1" exists, the process advances to step S406; otherwise, the process advances to step S410.

In step S406, the CPU 102 increments the area number maximum value by 1, and sets the area number of the unit tile determined as a blank tile to the updated area number maximum value. More specifically, if area_number [x3][y3]=−1 is satisfied, the following processing is performed.

max_area_number=max_area_number+1; and area_number[x3][y3]=max_area_number.

For example, here, since the area is an area detected for the first time after the processing of step S406 is executed for the first time, the area number maximum value is "1", and the area number of the tile is set to "1". From then on, every time step S406 is processed, max_area_number increases by one. After this, in steps S407 to S409, processing of expanding continuous non-blank areas as the same area is performed.

In step S407, the CPU 102 searches for a unit tile that is a tile adjacent to the unit tile whose area number is the area number maximum value and has the area number "−1". More specifically, the following determination is performed for the ranges of x=0 to 19 and y=0 to 26.

if(area_number[x][y]=max_area_number);

if((area_number[x−1][y]=−1) or;

(area_number[x+1][y]=−1) or;

(area_number[x][y−1]=−1) or; and (area_number[x][y+1]=−1))→adjacent tile with area number"−1" is detected. else→adjacent tile with area number "−1" is not detected Upon detecting an adjacent tile with the area number "−1" for the first time in the search in step S407, the process advances to step S408. In step S408, the CPU 102 determines whether an adjacent tile with the area number "−1" is detected.

If, as a result of the determination processing, an adjacent tile with the area number "−1" is detected, the process advances to step S409. Otherwise, the process returns to step S404.

In step S409, the CPU 102 sets the area number of the unit tile that is adjacent to the adjacent tile with the area number "−1" to the area number maximum value. More specifically, the following processing is performed by setting the position of the adjacent tile with the area number "−1" (the tile position of interest) to (x4, y4).

if((area_number[x4-1][y4]=−1) area_number[x4−1][y4]=max_area_number;

if((area_number[x4+1][y4]=−1) area_number[x4+1][y4]=max_area_number;

if((area_number[x4][y4-1]=−1) area_number[x4][y4-1]=max_area_number; and if((area_number[x4][y4+1]=−1) area_number[x4][y4+1]-max_area_number.

If the area number of the adjacent tile is updated in step S409, the process returns to step S407 to continue the search to check whether another adjacent non-blank tile exists. In a situation in which no adjacent non-blank tile exists, that is, if a tile to which the area number maximum value should be added does not exist, the process returns to step S404.

If the area numbers of all the unit tiles are not "−1", that is, if all the unit tiles are blank tiles or any area number is set, it is determined that there exists no unit tile with the area number "−1".

In step S410, the CPU 102 sets the area number maximum value as the number of areas. That is, the area number maximum value set so far is the number of areas existing in the page. The area setting processing in the page is thus ended.

Figure 13:
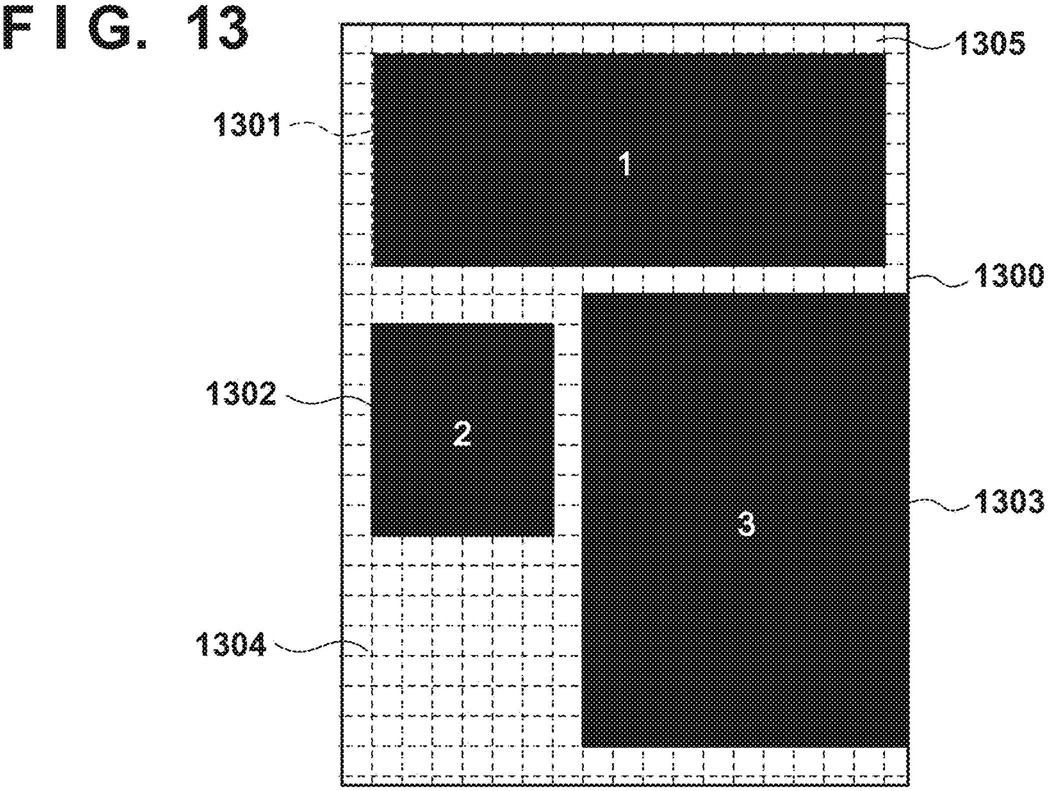
FIG. 13 is a view showing each unit tile after the end of the area setting processing.

FIG. 13 is a view showing each unit tile after the end of the area setting processing. A page 1300 in FIG. 13 represents the whole page. An area 1301 in FIG. 13 is an area drawn in accordance with a TEXT drawing instruction, an area 1302 is an area drawn in accordance with a BOX drawing instruction, an area 1303 is an area drawn in accordance with an IMAGE drawing instruction, and an area 1304 is an area in which none are drawn. In this case, the result of the area setting is as follows.

| | |
|---|---|
| Number of areas = 3 | |
| Area number = 0 | blank area 1304 |
| Area number = 1 | text area 1301 |
| Area number = 2 | box area 1302 |
| Area number = 3 | image area 1303 |

As shown in FIG. 13, the areas are spatially far apart via at least one blank tile. In other words, unit tiles between which no blank tile intervenes are considered to be adjacent and processed as the same area.

A human visual sense has a characteristic that the difference between two colors that are spatially adjacent or exist in very close places can relatively easily be perceived, but the difference between two colors that exist in places spatially far apart can relatively hardly be perceived. That is, the result of "output as different colors" can readily be perceived in a case when the processing is performed for identical colors that are spatially adjacent or exist in very close places, but can hardly be perceived in a case when the processing is performed for identical colors that exist in places spatially far apart.

In this embodiment, areas considered as different areas are separated by a predetermined distance or more on a paper surface. For example, if printing is executed on an A4 paper, a distance is 0.7 mm or more. The distance may be changed in accordance with a printed paper size. Alternatively, the distance may be changed in accordance with an assumed observation distance. Furthermore, even if the areas are not separated by the predetermined distance on the paper surface, different objects may be considered as different areas. For example, even if an image area and a box area are not separated by the predetermined distance, the object types are different, and thus these areas may be set as different areas.

In this embodiment, pixel positions considered to be in the same area are separated via a background color by a distance equal to or less than a predetermined distance on a paper surface. Examples of the background color are white, black, and gray. The background color may be a background color defined in original data. If printing is executed on an A4 paper, the predetermined distance is, for example, less than 0.7 mm. The distance may be changed in accordance with a printed paper size. Alternatively, the distance may be changed in accordance with an assumed observation distance. Furthermore, even if the areas are separated by the predetermined distance or smaller on the paper surface, the areas may be considered as different areas in the case of different objects. For example, even if an image area and a box area are separated by the predetermined distance or less, the object types are different, and thus these areas may be set as different areas.

As described above, in this embodiment, by performing area division as described above, it is possible to limit the number of combinations of pieces of color information to undergo color degeneration correction processing. By limiting the number of combinations of pieces of color information, it is possible to perform the same color degeneration correction even for different areas having the identical color distributions. As a result, the results of correction for graphs that are separated as areas but have identical pieces of color information can be identical.

Furthermore, by limiting the number of combinations of pieces of color information to undergo color degeneration correction processing, it is possible to increase a color gamut for increasing the distance between the pieces of color information, thereby decreasing the degree of color degeneration.

As described above, in this embodiment, even in the same page, portions that are spatially far apart are set as different areas and mapping suitable for each area is set, thereby making it possible to reduce a decrease in chroma and the degree of color degeneration.

In step S303, the CPU 102 may divide the original data into a plurality of "partial pages". "Partial page" in this embodiment will now be described. As described above, the original data as the print target is document data formed by a plurality of pages. "Partial page" represents how the plurality of pages included in the document data should be put together and subjected to creation of the above-described color degeneration-corrected gamut mapping table. For example, assume that the document data is formed by first to third pages. If each page is a target of creation of a mapping table, each of the first page, the second page, and the third page is a "partial page". If the first page and the second page, and the third page are targets of creation of a mapping table, the first page and the second page form a "partial page", and the third page also forms a "partial page". In addition, the "partial page" is not limited to a unit on a page basis included in the document data. For example, a partial area of the first page may be a "partial page". In step S303, the original data is divided into a plurality of "partial pages" in accordance with a predetermined unit of "partial pages". Note that the unit of "partial pages" may be designated by the user.

As described above, in this embodiment, even for a plurality of pages, partial pages are set as different areas, and the color degeneration-corrected gamut mapping table is applied to each area, thereby making it possible to reduce a decrease in chroma and the degree of color degeneration.

In this embodiment, correction processing is performed for each area. Therefore, identical input colors in different areas of the same page may be corrected to different pieces of color information due to a difference in color distribution between the areas. This causes a problem in a case when the fact that even different areas have identical pieces of color information has the meaning, as described in the first embodiment.

Figure 23:
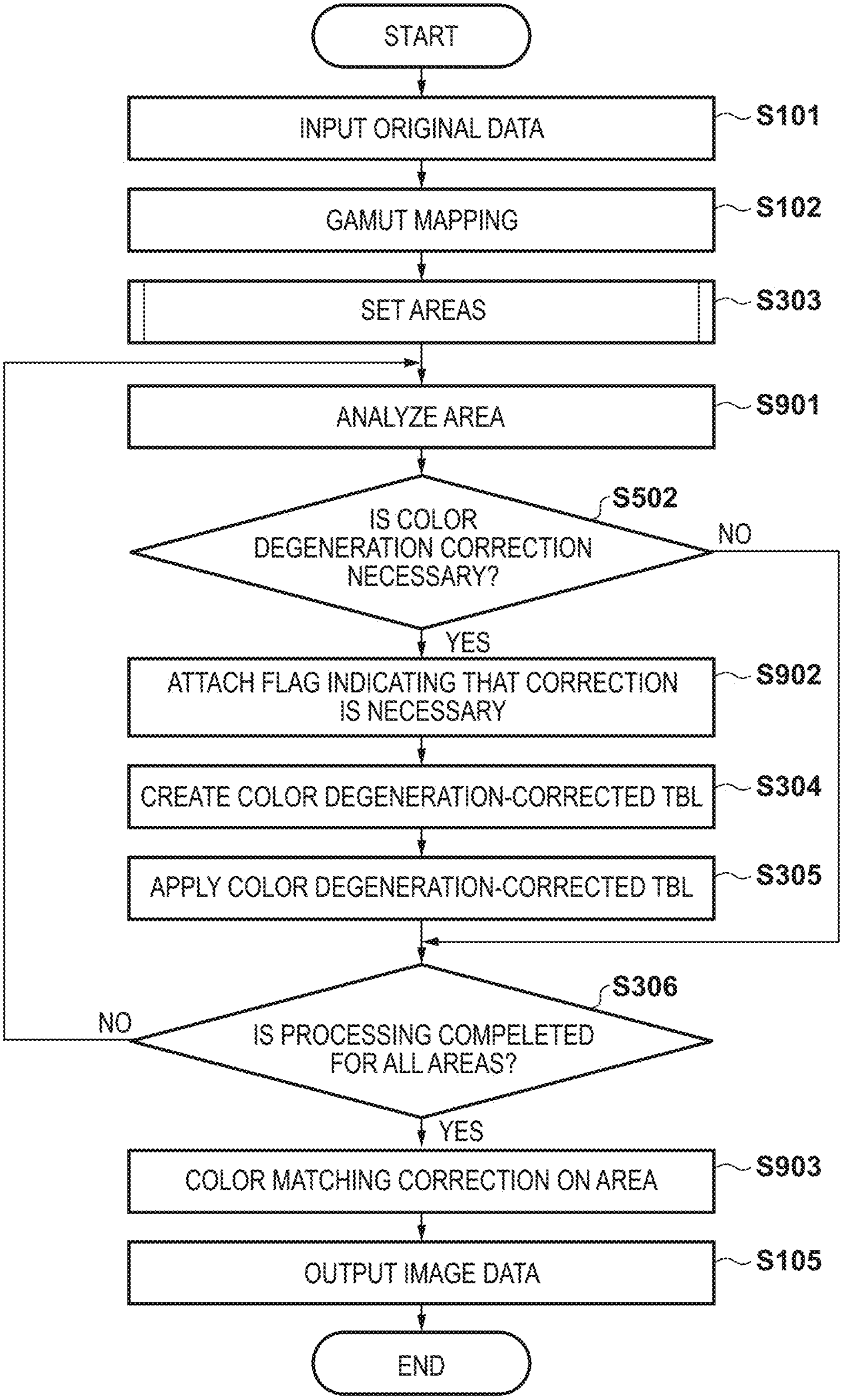
FIG. 23 is a flowchart of gamut mapping processing.

This problem can be solved by performing color matching correction described in the first embodiment for the areas. FIG. 23 is a flowchart of gamut mapping processing. In FIG. 23, the same step numbers as in FIGS. 2, 9, and 18 denote the same processing steps and a description thereof will be omitted.

In step S901, the CPU 102 performs analysis processing on the set area. In this analysis processing, the analysis target of page analysis in step S501 is an area, and the CPU 102 determines, for the area, in step S502, whether color degeneration correction is necessary. As a criterion for determining that color degeneration correction is necessary, a case when the area is a graphic area, a case when color degeneration has occurred as a result of performing mapping for an input color of the area, or a case when color degeneration of a predetermined proportion or more occurs for an input color of the area may be used. If, as a result of the determination processing, it is determined that color degeneration correction is necessary, the process advances to step S902; otherwise, the process advances to step S306.

In step S902, with respect to an area for which it is determined that color degeneration correction is necessary, the CPU 102 stores information (flag) indicating that color degeneration correction is necessary for the area in the RAM 103 in association with the area.

In step S304, the CPU 102 creates a color degeneration-corrected TBL for the area for which it is determined that color degeneration correction is necessary. A method of creating a color degeneration-corrected TBL is the same as in step S103 described above.

In step S305, the CPU 102 applies the color degeneration-corrected TBL created in step S304 to the area for which it is determined that color degeneration correction is necessary. In step S306, it is determined whether the analysis processing of step S901 has been performed for all the areas.

If, as a result of the determination processing, the analysis processing of step S901 has been performed for all the areas, the process advances to step S903. If there remains an area for which the analysis processing of step S901 has not been performed, the process returns to step S901.

In step S903, the CPU 102 performs color matching correction for the area for which it is determined that color degeneration correction is necessary. Details of the processing in step S903 will be described with reference to a flowchart shown in FIG. 19. Similarly, this processing is performed by setting the area as the target of color matching correction of the page in step S507.

With this above-described processing, while maintaining the relationship between output colors existing in each area as much as possible, pieces of color information recognized as identical pieces of color information with respect to input colors are corrected to pieces pieces of color information that are recognized as identical pieces of color information with respect to output colors. As a result, it is possible to correct pieces of color information to those that are recognized as identical pieces of color information even in different areas in an original in which each color has the meaning while suppressing a decrease in identifiability between the output colors existing in each area as much as possible. In this processing, the determination processing may be performed for the color degeneration-corrected TBL generated for each area, and color matching correction may be performed for the TBL.

Fifth Embodiment

If the processing according to the above-described flowchart of FIG. 23 is executed using an image processing accelerator 105, the upper limit of the number of arithmetic circuits for applying the color degeneration-corrected TBL to image data is decided based on the characteristic of the image processing accelerator 105. Therefore, if the number of areas in the image data exceeds the upper limit of the number of arithmetic circuits, the problem that the processing speed decreases arises. The same is applied to a case when the CPU 102 is the main constituent of the processing. This embodiment will describe a processing procedure of making it possible to suppress a decrease in processing speed even if the CPU 102 is the main constituent of the processing but the image processing accelerator 105 may be the main constituent of the following processing.

Figure 24:
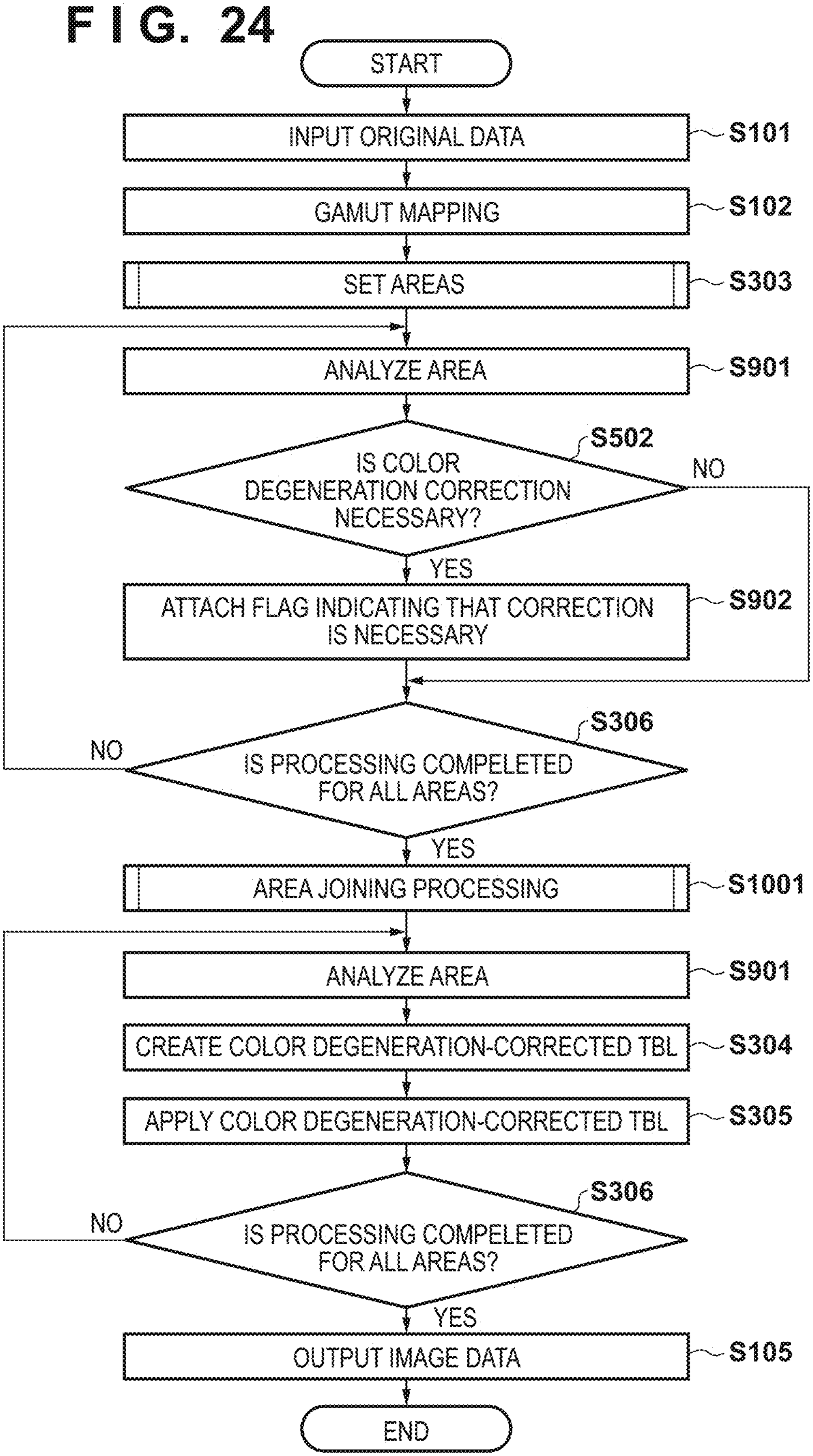
FIG. 24 is a flowchart of gamut mapping processing.

Gamut mapping processing according to this embodiment will be described with reference to a flowchart shown in FIG. 24. In FIG. 24, the same step numbers as in FIGS. 2, 9, 18, and 23 denote the same processing steps and a description thereof will be omitted.

Figure 25:
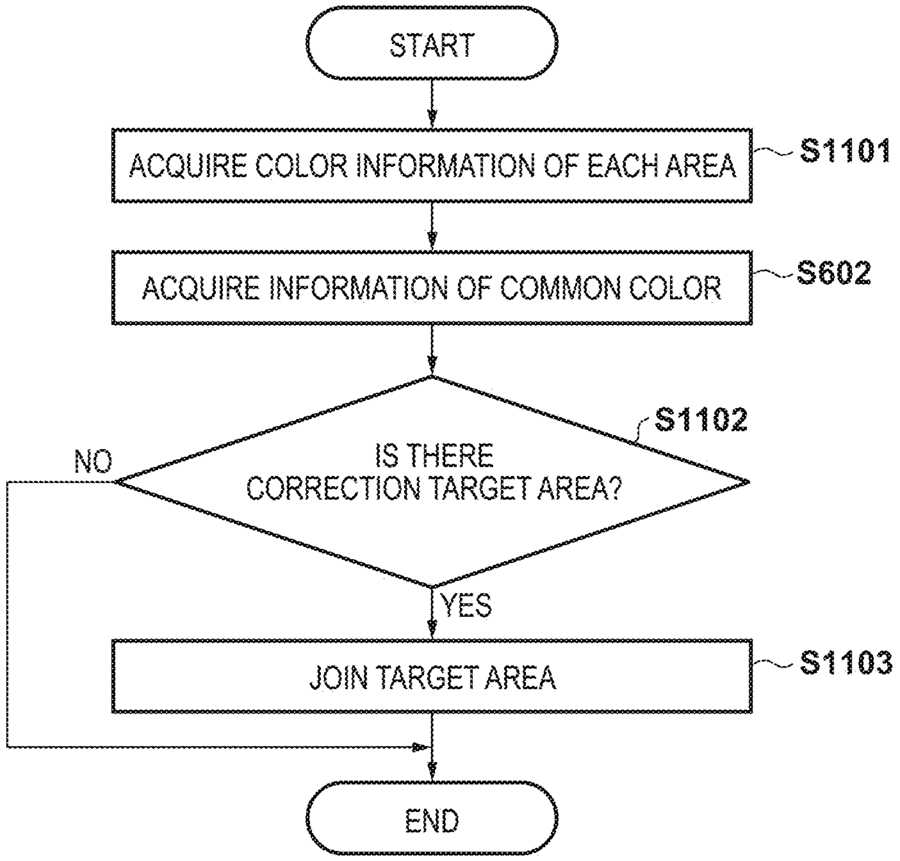
FIG. 25 is a flowchart illustrating details of processing in step S1001.

In step S1001, a CPU 102 performs area joining processing. Details of the processing of step S1001 will be described with reference to a flowchart shown in FIG. 25. In step S1101, the CPU 102 acquires color information of each area (color information other than an output color since the color degeneration-corrected TBL is not applied to the image data at this time).

Similar to the fourth embodiment, in step S602, the CPU 102 performs the same processing as in step S602 described above by setting the area as a target, thereby acquiring color information of a common color. In step S1102, the CPU 102 determines whether there exists a color matching correction target area. If there is no common color, it is determined that there is no color matching correction target area, and the process advances to step S901. On the other hand, if there exists the common color, it is determined that there exists a color matching correction target area, and the process advances to step S1103.

In step S1103, the CPU 102 joins the color matching correction target area to set one new area including all the color matching correction target areas. The processing in step S1103 will be described by exemplifying FIG. 26.

Figure 26:
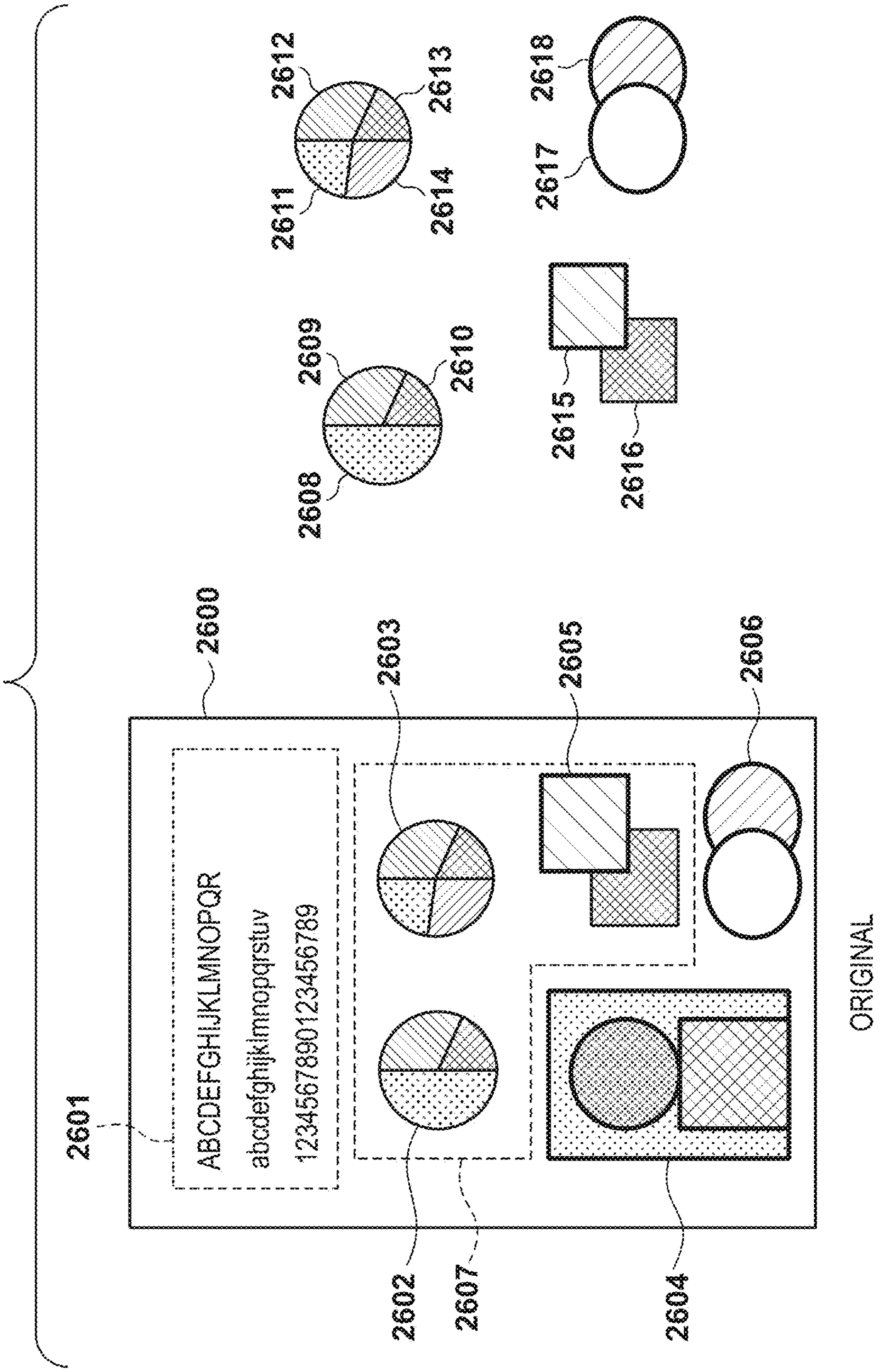
FIG. 26 is a view for explaining an example of processing in step S1103.

Image data 2600 shown in FIG. 26 is an example of image data including a plurality of graphic areas. Areas 2602, 2603, 2605, and 2606 are graphic areas, and are areas each associated with a flag indicating that color degeneration correction in this processing is necessary. An input color 2608 is identical to an input color 2611, an input color 2609 is identical to an input color 2612, and input colors 2610, 2613, and 2616 are identical.

In this image data, if a color matching target is set when at least one common color exists, an area 2607 including the three areas 2602, 2603, and 2605 is newly set in step S1103. Then, area analysis is performed again by including the area newly set by this processing, and a color degeneration-corrected TBL is created for each area. Referring to FIG. 26, a color degeneration-corrected TBL is created for each of the areas 2606 and 2607. At this time, the areas 2602, 2603, and 2605 may be considered as one area without setting the area 2607, and area analysis may be performed again to create a color degeneration-corrected TBL. That is, the areas need not be continuous areas on the image data, and it is only necessary to be able to perform correction processing for all the areas including the common color.

With the above processing, with respect to the areas 2602, 2603, and 2605, a common color degeneration-corrected TBL is created with reference to a color included in the three areas, and the common color is corrected to the same color in the three areas.

If it is determined in step S1102 that there exist only combinations of input colors in the areas that have a predetermined color difference or more, there is no area including a common color, and thus color matching correction is unnecessary, the process advances to step S901. Then, the CPU 102 performs analysis processing of the area in step S901, creates a color degeneration-corrected TBL for the selected area in step S304, and performs correction by applying, to the selected area, the color degeneration-corrected TBL created for the selected area in step S305.

With the above-described processing, the common color is corrected to the same color in each of the areas including the common color, and if the common color exists, the number of areas to undergo correction decreases. This decreases the number of times the number of arithmetic circuits is exceeded, and improves the processing speed.

Sixth Embodiment

If the first embodiment is executed in the case shown in FIG. 21, determination is performed for a color degeneration-corrected TBL generated for each area in the fourth embodiment, and if color matching correction is performed for the color degeneration-corrected TBL, it is necessary to save the color degeneration-corrected TBL. By exemplifying FIG. 21, the color degeneration-corrected TBL stored/saved in step S701 is stored/saved in the RAM 103 or the storage medium 104, and is transferred and applied to the CPU 102. That is, since the number of color degeneration-corrected TBLs is always proportional to the number of pages, a long processing time is required for image data including a large number of pages. The same problem also arises in the fourth embodiment in which the correction target is an area, and a long processing time is required for image data including a large number of areas.

Figure 27:
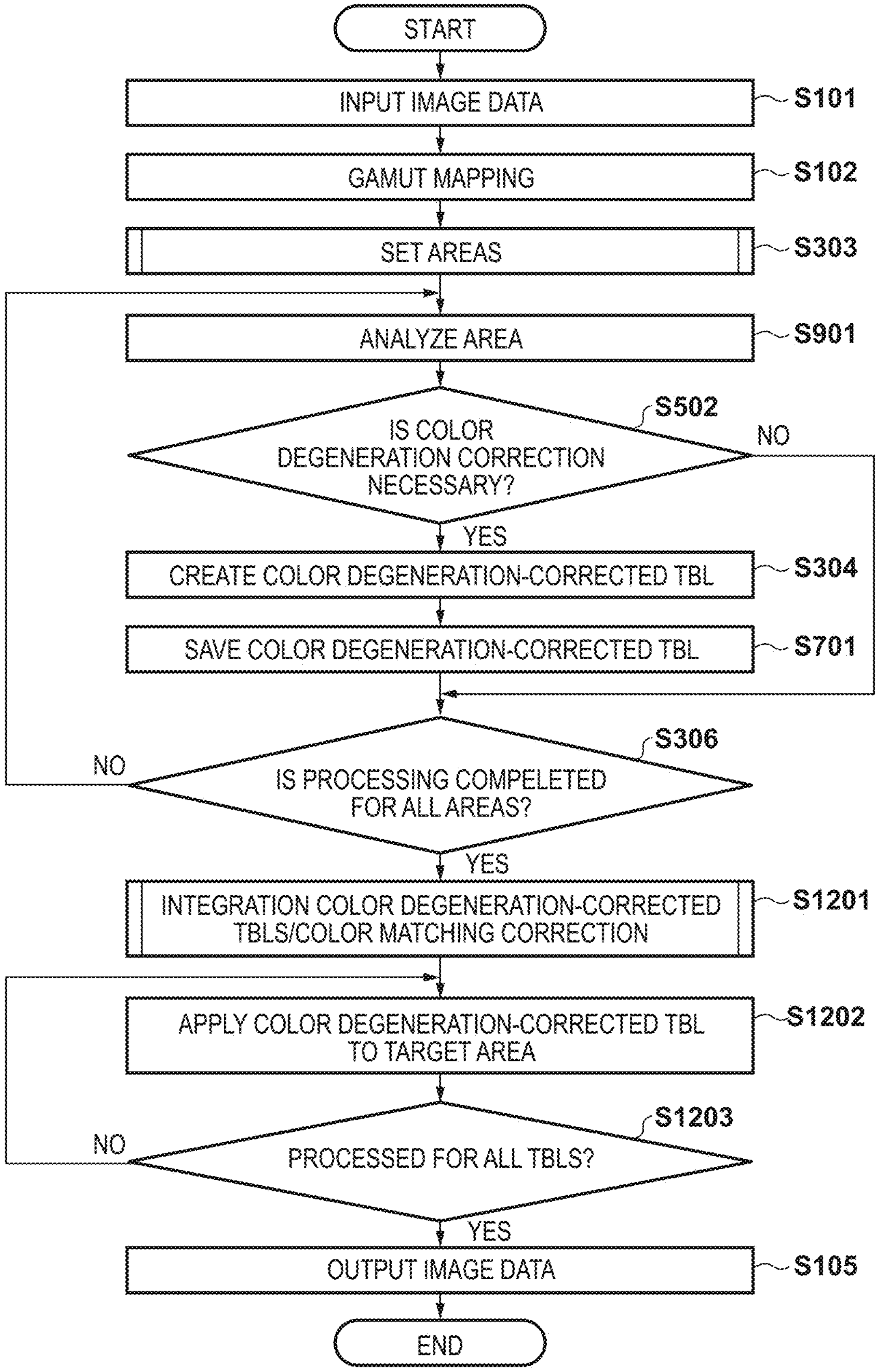
FIG. 27 is a flowchart of gamut mapping processing.

Gamut mapping processing according to this embodiment will be described with reference to a flowchart shown in FIG. 27. In FIG. 27, the same step numbers as in other drawings denote the same processing steps and a description thereof will be omitted.

Figure 28:
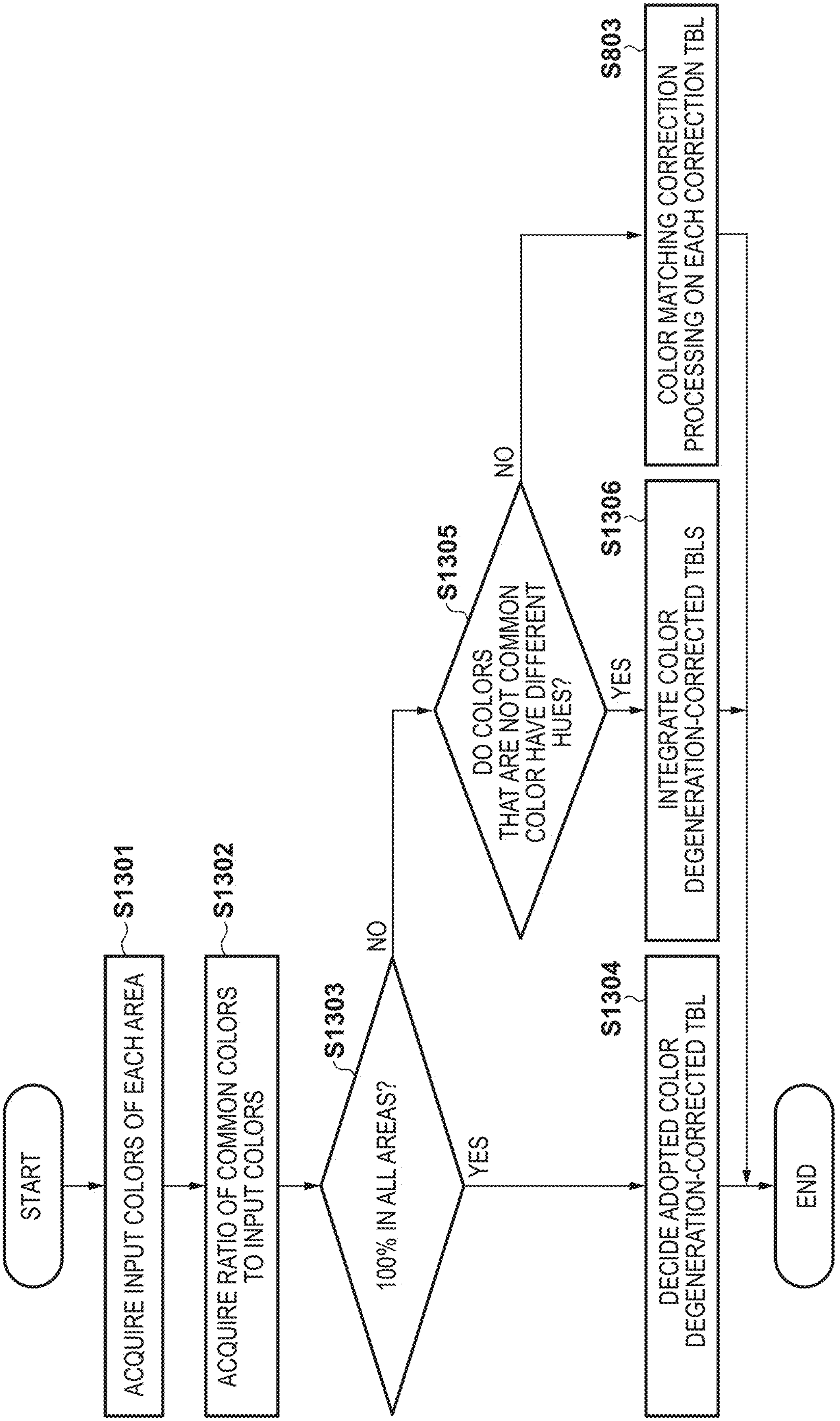
FIG. 28 is a flowchart illustrating details of processing in step S1201.

If it is determined, in the determination processing in step S306, that all areas set in step S303 have been selected as selected areas, the process advances to step S1201. In step S1201, a CPU 102 integrates the color degeneration-corrected TBLs and performs color matching correction. Details of the processing in step S1201 will be described with reference to a flowchart shown in FIG. 28. As an example, this processing is performed for areas 2602 and 2603 shown in FIG. 26.

In step S1301, the CPU 102 acquires input colors of each area. The CPU 102 acquires input colors 2608, 2609, and 2610 with respect to the area 2602, and acquires input colors 2611, 2612, 2613, and 2614 with respect to the area 2603.

Next, in step S1302, the CPU 102 calculates a ratio of common colors to the input colors. In this example, the input colors 2608 and 2611 are common, the input colors 2609 and 2612 are common, and the input colors 2610 and 2613 are common.

In step S1303, the CPU 102 determines whether all the input colors of each area are common colors (100%). If, as a result of the determination processing, all the input colors of each area are common colors (100%) (YES), the process advances to step S1304. On the other hand, if the condition that all the input colors of each area are common colors (100%) is not satisfied (NO), the process advances to step S1305.

In the example shown in FIG. 26, the area 2602 includes the three input colors and all of the colors are common colors. On the other hand, the area 2603 includes the four input colors and the input color 2614 among the colors is not a common color. Therefore, NO is determined as a result of the determination processing in step S1303. A case when YES is determined as a result of the determination processing is a case when all the input colors of each area are common colors.

In step S1304, the CPU 102 selects one of the color degeneration-corrected TBLs, and discards all the unselected color degeneration-corrected TBLs. In step S1305, the CPU 102 acquires the hue of the color that is not a common color existing in each area. In this example, the hue of the input color 2614 is acquired. Then, the CPU 102 checks, for each area, whether the color has hue different from those of the common colors. In this example, in the area 2603, it is determined whether the input color 2614 that is not a common color has the same hue as those of other common colors. The same hue may be determined in a case where hue angles are completely the same or a difference between hue angles is equal to or less than a predetermined value. In this example, a hue angle unit as a target when performing color degeneration correction is used. If the color has the same hue, the color that is not a common color is involved with correction of other common colors. On the other hand, if the color has different hue, the color is not involved with correction of the common colors, and thus the same correction is performed for both the areas as correction of the common colors. If the input color 2614 has hue different from those of the common colors, YES is determined in step S1305 and the process advances to step S1306.

In step S1306, the CPU 102 integrates the color degeneration-corrected TBLs created for the respective areas into one color degeneration-corrected TBL reflecting corrected portions of the color degeneration-corrected TBLs. A practical method of an integration procedure will be described. In this example, the first color degeneration-corrected TBL created for the area 2602 and the second color degeneration-corrected TBL created for the area 2603 are integrated. A portion where the input color 2614 that is not a common color is corrected is a portion of a grid closest to the input color 2614 on the color space in the second color degeneration-corrected TBL. Therefore, a TBL is created in a portion of a corresponding grid in the first color degeneration-corrected TBL by copying the value in the second color degeneration-corrected TBL, and the second color degeneration-corrected TBL is discarded. Alternatively, the second color degeneration-corrected TBL may be adopted intact and the first color degeneration-corrected TBL may be discarded. Alternatively, the two color degeneration-corrected TBLs may be discarded, and one new color degeneration-corrected TBL may be created by performing analysis processing for one new area including the areas.

If the input color 2614 does not have hue different from those of the common colors, NO is determined in step S1305, and the process advances to step S803. In step S803, the CPU 102 performs color matching correction processing of the color degeneration-corrected TBL.

If the processing in step S1304 or S1306 is performed, one color degeneration-corrected TBL is applied to the plurality of areas. Therefore, after the end of the processing according to the flowchart shown in FIG. 28, the CPU 102 applies the color degeneration-corrected TBL not to each area but to each color degeneration-corrected TBL in step S1202.

In step S1203, the CPU 102 determines whether all the color degeneration-corrected TBLs have been applied in step S1202. If, as a result of the determination processing, all the color degeneration-corrected TBLs have been applied in step S1202, the process advances to step S105. On the other hand, if there remains a color degeneration-corrected TBL that has not been applied in step S1202, the process returns to step S1202.

As described above, according to this embodiment, the number of color degeneration-corrected TBLs decreases depending on the color distributions of the areas. This reduces the transfer time of the color degeneration-corrected TBLs, and improve the processing speed.

Numerical values, processing timings, processing orders, main constituents of processing, structures/acquisition methods/transmission destinations/transmission sources/storage locations of data (information) used in the above-described embodiments are merely examples for a detailed explanation. The present invention is not intended to limit these to the examples.

Some or all of the above-described embodiments may be used in combinations as needed. Alternatively, some or all of the above-described embodiments may selectively be used.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:

a color conversion unit configured to perform color conversion of color information of image data into color information of a different color gamut using color conversion information;

an acquisition unit configured to acquire a first color information group included in a first area of the image data and a second color information group included in a second area of the image data; and a determination unit configured to determine, for each of a plurality of pieces of color information of the first color information group, whether color information representing substantially the same color as one piece of color information of the first color information group is included in the second color information group, wherein, in a case when a determination result of the determination unit indicates that first color information of the first color information group represents substantially the same color as second color information of the second color information group, a color difference between a first conversion color obtained by performing color conversion of the first color information using first color conversion information and a second conversion color obtained by performing color conversion of the second color information using second color conversion information is less than a predetermined value.

2. The apparatus according to claim 1, further comprising a correction unit configured to correct at least one of the first color conversion information and the second color conversion information based on the determination result of the determination unit.

3. The apparatus according to claim 1, wherein the color conversion unit converts each piece of color information of the first area using the first color conversion information, and converts each piece of color information of the second area using the second color conversion information.

4. The apparatus according to claim 1, wherein the acquisition unit acquires the first color information group and the second color information group with the number of tones smaller than the number of tones indicated by the color information of the image data.

5. The apparatus according to claim 1, wherein the first color conversion information used for color conversion of the first color information and the second color conversion information used for color conversion of the second color information are substantially the same.

6. The apparatus according to claim 5, wherein the color conversion unit performs color conversion of each piece of color information of a third area including the first area and the second area using one piece of color conversion information.

7. The apparatus according to claim 1, wherein, in a case when the determination unit determines, for each of the plurality of pieces of color information of the first color information group, that color information representing substantially the same color as one piece of color information of the first color information group is not included in the second color information group, the color conversion unit performs color conversion of each piece of color information of the first area using third color conversion information and performs color conversion of each piece of color information of the second area using fourth color conversion information.

8. The apparatus according to claim 7, wherein the third color conversion information is obtained by correcting color conversion information prepared in advance so that each color difference between output colors obtained after performing color conversion of the respective pieces of color information of the first area is not smaller than a predetermined threshold, and the fourth color conversion information is obtained by correcting the color conversion information prepared in advance so that each color difference between output colors obtained after performing color conversion of the respective pieces of color information of the second area is not smaller than a predetermined threshold.

9. The apparatus according to claim 1, wherein the first area and the second area are graphic areas.

10. The apparatus according to claim 1, wherein the predetermined value is ΔE=2.0.

11. An image processing method comprising:

performing color conversion of color information of image data into color information of a different color gamut using color conversion information;

acquiring a first color information group included in a first area of the image data and a second color information group included in a second area of the image data; and determining, for each of a plurality of pieces of color information of the first color information group, whether color information representing substantially the same color as one piece of color information of the first color information group is included in the second color information group, wherein, in a case when a result of the determination indicates that first color information of the first color information group represents substantially the same color as second color information of the second color information group, a color difference between a first conversion color obtained by performing color conversion of the first color information using first color conversion information and a second conversion color obtained by performing color conversion of the second color information using second color conversion information is less than a predetermined value.

12. A non-transitory computer-readable storage medium storing a computer program for causing a computer to function as:

a color conversion unit configured to perform color conversion of color information of image data into color information of a different color gamut using color conversion information;

an acquisition unit configured to acquire a first color information group included in a first area of the image data and a second color information group included in a second area of the image data; and a determination unit configured to determine, for each of a plurality of pieces of color information of the first color information group, whether color information representing substantially the same color as one piece of color information of the first color information group is included in the second color information group, wherein, in a case when a determination result of the determination unit indicates that first color information of the first color information group represents substantially the same color as second color information of the second color information group, a color difference between a first conversion color obtained by performing color conversion of the first color information using first color conversion information and a second conversion color obtained by performing color conversion of the second color information using second color conversion information is less than a predetermined value.

* * * * *